(12) United States Patent
Kou et al.

(10) Patent No.: US 12,726,431 B2
(45) Date of Patent: Sep. 1, 2026

(54) AGGREGATION LINK ESTABLISHMENT AND COMMUNICATION BETWEEN RADIO BEARERS AND LAYER ENTITIES OF USER DEVICES

(71) Applicant: ZTE Corporation, Shenzhen (CN)

(72) Inventors: Shuaihua Kou, Shenzhen (CN); Xianghui Han, Shenzhen (CN); Peng Hao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 130 days.

(21) Appl. No.: 18/607,038

(22) Filed: Mar. 15, 2024

(65) Prior Publication Data

US 2024/0305559 A1 Sep. 12, 2024

Related U.S. Application Data

(63) Continuation of application No. PCT/CN2022/071934, filed on Jan. 14, 2022.

(51) Int. Cl.
*H04L 45/24* (2022.01)
*H04L 43/10* (2022.01)
*H04L 43/16* (2022.01)

(52) U.S. Cl.
CPC ............ *H04L 45/245* (2013.01); *H04L 43/10* (2013.01); *H04L 43/16* (2013.01)

(58) Field of Classification Search
CPC ....... H04L 45/245; H04L 43/10; H04L 67/12; H04L 43/16; H04W 12/10; H04W 80/02; H04W 76/14; H04W 12/03
See application file for complete search history.

(56) References Cited

U.S. PATENT DOCUMENTS

2018/0324642 A1 11/2018 Yu et al.
2019/0215685 A1* 7/2019 Wang .................... H04W 80/02
(Continued)

FOREIGN PATENT DOCUMENTS

CN 110870342 A 3/2020
CN 113424580 A 9/2021
(Continued)

OTHER PUBLICATIONS

M. A. Alam and S. Khatibi, "CPU Resource Usage Analysis for Downlink PDCP Processing in CRAN," 2020 IEEE 31st Annual International Symposium on Personal, Indoor and Mobile Radio Communications, London, UK, 2020, pp. 1-5, (Year: 2020).*
U. Toseef, T. Weerawardane, A. Timm-Giel and C. Gorg, "LTE system performance optimization by discard timer based PDCP buffer management," 8th International Conference on High-capacity Optical Networks and Emerging Technologies, Riyadh, Saudi Arabia, 2011, pp. 116-121 (Year: 2011).*
(Continued)

*Primary Examiner* — Messeret F Gebre
(74) *Attorney, Agent, or Firm* — Crowell & Moring LLP

(57) ABSTRACT

This document generally relates to establishing an aggregation link between layer entities of two user devices, and communicating data packets over the aggregation link. One user device may function as a primary user device that performs transmissions with a wireless access node. The other user device may function as a secondary user device that communicates data packets between the wireless access node and the primary user device for the transmissions. The wireless access node may communicate data packets between a protocol stack configuration for the primary user device and a protocol stack configuration for the secondary user device for the transmissions.

11 Claims, 9 Drawing Sheets

(56) References Cited

U.S. PATENT DOCUMENTS

| | | | |
|---|---|---|---|
| 2019/0268799 | A1 | 8/2019 | Hong et al. |
| 2020/0351859 | A1 | 11/2020 | Chae et al. |
| 2020/0382246 | A1 | 12/2020 | Lee et al. |
| 2021/0068176 | A1* | 3/2021 | Luo ......................... H04L 43/16 |
| 2021/0153063 | A1 | 5/2021 | Zhang et al. |
| 2021/0274584 | A1* | 9/2021 | Wang .................... H04L 1/1896 |
| 2022/0240142 | A1* | 7/2022 | Jo ..................... H04W 74/0833 |

FOREIGN PATENT DOCUMENTS

| | | | |
|---|---|---|---|
| EP | 4 114 138 | A1 | 1/2023 |
| WO | WO 2021/067794 | A1 | 4/2021 |
| WO | WO 2021/126493 | A1 | 6/2021 |
| WO | WO 2021/200510 | A1 | 10/2021 |

OTHER PUBLICATIONS

International Search Report and Written Opinion for International Application No. PCT/CN2022/071934 mailed Oct. 10, 2022 (6 pages).

CATT, "PDCP routing for split bearer", 3GPP TSG-RAN WG2 #99, R2-1707936, Aug. 25, 2017 (5 pages).

Japanese Office Action issued in JP Application No. 2024-516851 mailed Oct. 3, 2025 including with English translation (6 pages).

Canadian Office Action issued in Application No. 3,231,908 dated Feb. 3, 2026 (6 pages)

Extended European Search Report issued in European Application No. 22919447.7 dated Apr. 1, 2025 (7 pages).

* cited by examiner

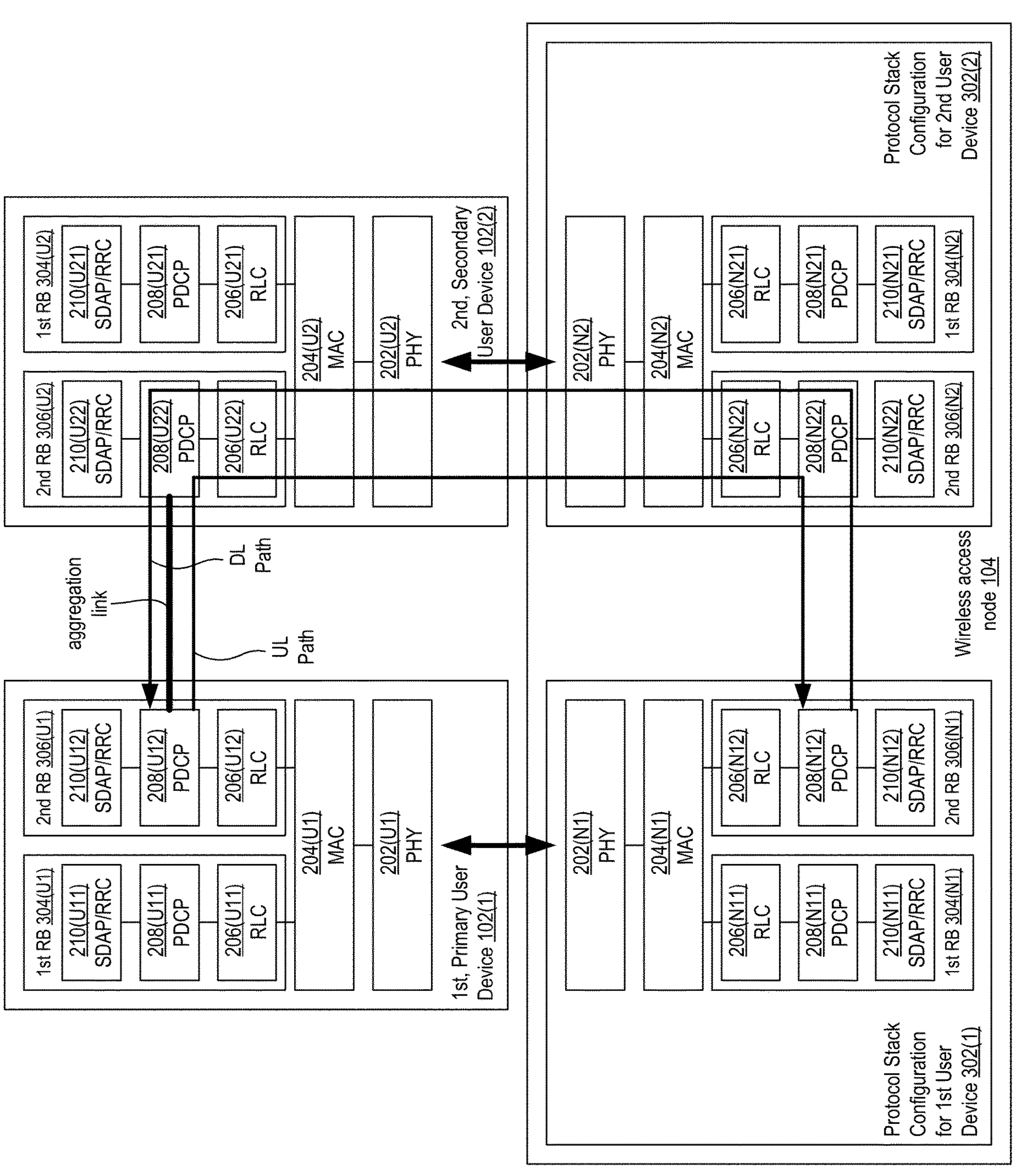

FIG. 6
2nd, Secondary User Device 102(2)
1st RB 304(U2)
210(U21) SDAP/RRC
208(U21) PDCP
206(U21) RLC
2nd RB 306(U2)
210(U22) SDAP/RRC
208(U22) PDCP
206(U22) RLC
204(U2) MAC
202(U2) PHY
aggregation link
DL Path
UL Path
1st, Primary User Device 102(1)
1st RB 304(U1)
210(U11) SDAP/RRC
208(U11) PDCP
206(U11) RLC
2nd RB 306(U1)
210(U12) SDAP/RRC
208(U12) PDCP
206(U12) RLC
204(U1) MAC
202(U1) PHY
Wireless access node 104
Protocol Stack Configuration for 2nd User Device 302(2)
202(N2) PHY
204(N2) MAC
1st RB 304(N2)
206(N21) RLC
208(N21) PDCP
210(N21) SDAP/RRC
2nd RB 306(N2)
206(N22) RLC
208(N22) PDCP
210(N22) SDAP/RRC
Protocol Stack Configuration for 1st User Device 302(1)
202(N1) PHY
204(N1) MAC
1st RB 304(N1)
206(N11) RLC
208(N11) PDCP
210(N11) SDAP/RRC
2nd RB 306(N1)
206(N12) RLC
208(N12) PDCP
210(N12) SDAP/RRC

AGGREGATION LINK ESTABLISHMENT AND COMMUNICATION BETWEEN RADIO BEARERS AND LAYER ENTITIES OF USER DEVICES

CROSS-REFERENCE TO RELATED APPLICATIONS

This application is a continuation of International Patent Application No. PCT/CN2022/071934, filed Jan. 14, 2022. The contents of International Patent Application No. PCT/CN2022/071934 are herein incorporated by reference in their entirety.

TECHNICAL FIELD

This document is directed generally to aggregation links for wireless communication between user devices.

BACKGROUND

New Radio (NR) supports various types of user devices, examples of which include mobile devices, wearable devices, customer premises equipment, vehicular devices, and Internet of Things (IoT) devices. These different types of user devices have different capabilities than each other, and some types may not be able to support as high of performance capabilities, such as transmit power, bandwidth, data rate, or uplink coverage, as possible. As such, ways for user devices to communicate at higher data rates than their performance capabilities otherwise dictates may be desirable.

SUMMARY

This document relates to methods, systems, apparatuses and devices for wireless communication. In some implementations, a method for wireless communication includes: establishing, with a first user device, an aggregation link between a first layer entity of the first user device and a second layer entity of a second user device; and communicating, with the first user device, a data packet with the second user device over the aggregation link.

In other implementations, a method for wireless communication includes: communicating a data packet between a first layer entity of a first protocol stack configuration of a wireless access node and a second layer entity of a second protocol stack configuration of the wireless access node, the first protocol stack configuration for a first user device and the second protocol stack configuration for a second user device, the data packet for a transmission between the wireless access node and the first user device; and communicating, with the second protocol stack configuration, the data packet with the second user device.

In some other implementations, a device, such as a network device, is disclosed. The device may include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causing the one or more processors to implement any one of the methods above.

The above and other aspects and their implementations are described in greater detail in the drawings, the descriptions, and the claims.

BRIEF DESCRIPTION OF THE DRAWINGS

FIG. 6 shows a block diagram of fourth example protocol stack configurations for a primary user device, a secondary user device, and a wireless access node.

DETAILED DESCRIPTION

The present description describes various embodiments of systems, apparatuses, devices, and methods for wireless communications involving aggregation links between user devices. Such apparatuses, systems, and/or methods may allow higher data rates and/or higher reliability for a primary user device, and/or may enable communication between the primary user device and the network, even if the primary user device is out of network coverage.

Figure 1:
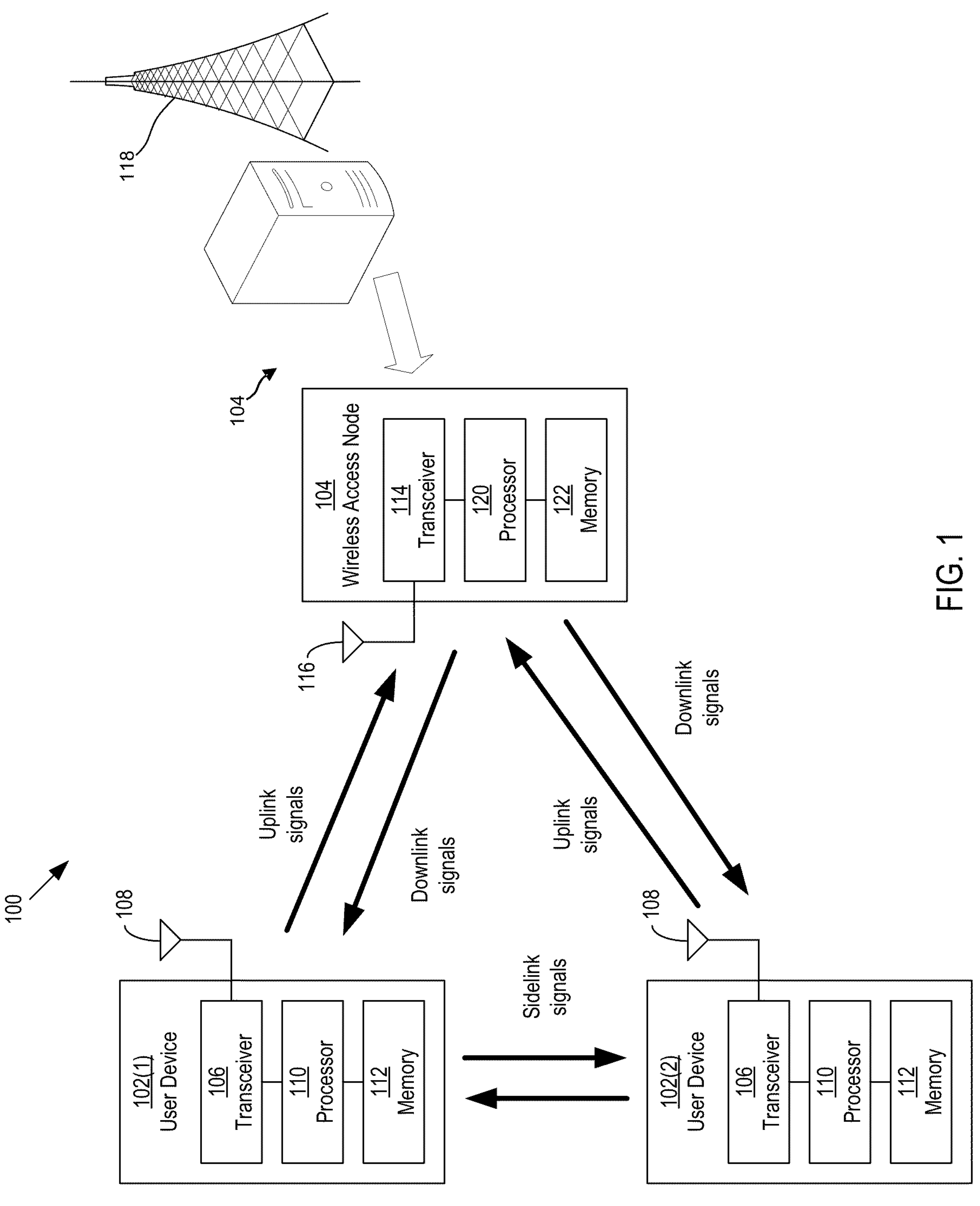
FIG. 1 shows a block diagram of an example of a wireless communication system.

FIG. 1 shows a diagram of an example wireless communication system 100 including a plurality of communication nodes (or just nodes) that are configured to wirelessly communicate with each other. In general, the communication nodes include at least one user device 102 and at least one wireless access node 104. The example wireless communication system 100 in FIG. 1 is shown as including two user devices 102, including a first user device 102(1) and a second user device 102(2), and one wireless access node 104. However, various other examples of the wireless communication system 100 that include any of various combinations of user devices 102 and wireless access nodes 104, including two or more user devices 102 without any wireless access nodes 104, only one user device 102 and only one wireless access node 104, only one user device 102 and two or more wireless access nodes 104, two or more user devices 102 and one or more wireless access nodes 104, or two or more wireless access nodes 104 without any user devices 102.

In general, a user device as described herein, such as the user devices 102, may include a single electronic device or apparatus, or multiple (e.g., a network of) electronic devices or apparatuses, capable of communicating wirelessly over a network. A user device may comprise or otherwise be referred to as a user terminal, a user terminal device, or a user equipment (UE). Additionally, a user device may be or include, but not limited to, a mobile device (such as a mobile phone, a smart phone, a smart watch, a tablet, a laptop computer, vehicle or other vessel (human, motor, or engine-powered, such as an automobile, a plane, a train, a ship, or a bicycle as non-limiting examples) or a fixed or stationary device, (such as a desktop computer or other computing device that is not ordinarily moved for long periods of time, such as appliances, other relatively heavy devices including Internet of things (IoT), or computing devices used in commercial or industrial environments, as non-limiting examples). In various embodiments, a user device 102 may include transceiver circuitry 106 coupled to an antenna 108 to effect wireless communication with the wireless access node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Additionally, in general, a wireless access node as described herein, such as the wireless access node 104, may include a single electronic device or apparatus, or multiple (e.g., a network of) electronic devices or apparatuses, and may comprise one or more base stations or other wireless network access points capable of communicating wirelessly over a network with one or more user devices and/or with one or more other wireless access nodes 104. For example, the wireless access node 104 may comprise a 4G LTE base station, a 5G NR base station, a 5G central-unit base station, a 5G distributed-unit base station, a next generation Node B (gNB), an enhanced Node B (eNB), or other similar or next-generation (e.g., 6G) base stations, in various embodiments. A wireless access node 104 may include transceiver circuitry 114 coupled to an antenna 116, which may include an antenna tower 118 in various approaches, to effect wireless communication with the user device 102 or another wireless access node 104. The transceiver circuitry 114 may also be coupled to one or more processors 120, which may also be coupled to a memory 122 or other storage device. The memory 122 may store therein instructions or code that, when read and executed by the processor 120, cause the processor 120 to implement one or more of the methods described herein.

In various embodiments, two communication nodes in the wireless system 100—such as a user device 102 and a wireless access node 104, two user devices 102 without a wireless access node 104, or two wireless access nodes 104 without a user device 102—may be configured to wirelessly communicate with each other in or over a mobile network and/or a wireless access network according to one or more standards and/or specifications. In general, the standards and/or specifications may define the rules or procedures under which the communication nodes can wirelessly communicate, which, in various embodiments, may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

Additionally, in the wireless system 100, the communication nodes are configured to wirelessly communicate signals between each other. In general, a communication in the wireless system 100 between two communication nodes can be or include a transmission or a reception, and is generally both simultaneously, depending on the perspective of a particular node in the communication. For example, for a given communication between a first node and a second node where the first node is transmitting a signal to the second node and the second node is receiving the signal from the first node, the first node may be referred to as a source or transmitting node or device, the second node may be referred to as a destination or receiving node or device, and the communication may be considered a transmission for the first node and a reception for the second node. Of course, since communication nodes in a wireless system 100 can both send and receive signals, a single communication node may be both a transmitting/source node and a receiving/destination node simultaneously or switch between being a source/transmitting node and a destination/receiving node.

Also, particular signals can be characterized or defined as either an uplink (UL) signal, a downlink (DL) signal, or a sidelink (SL) signal. An uplink signal is a signal transmitted from a user device 102 to a wireless access node 104. A downlink signal is a signal transmitted from a wireless access node 104 to a user device 102. A sidelink signal is a signal transmitted from a one user device 102 to another user device 102, or a signal transmitted from one wireless access node 104 to a another wireless access node 104. Also, for sidelink transmissions, a first/source user device 102 directly transmits a sidelink signal to a second/destination user device 102 without any forwarding of the sidelink signal to a wireless access node 104.

Additionally, as used herein, a direct connection or link over or via which two user devices 102 communicate (transmit and receive) sidelink signals is referred to as an aggregation link. When two user devices 102 establish an aggregation link between each other, the two user devices 102 may directly communicate or exchange data or other information between them by communicating one or more sidelink signals over or via the aggregation link.

Figure 2:
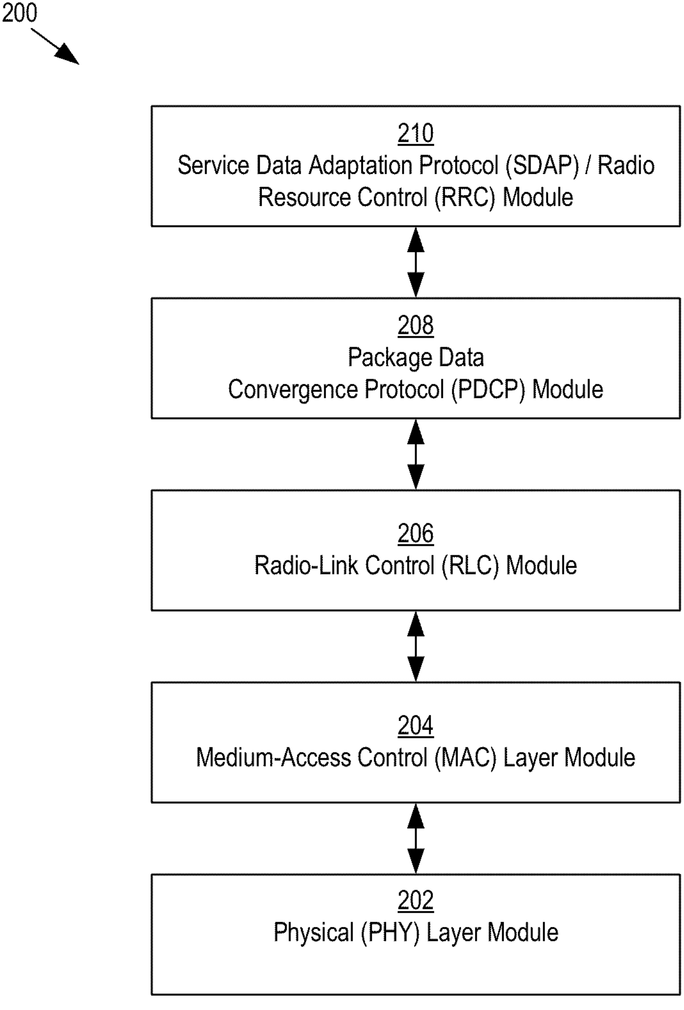
FIG. 2 shows a block diagram of an example protocol stack for a communication node.

FIG. 2 shows a block diagram of an example protocol stack 200 plurality of layer entities or modules of a communication node (e.g., a user device 102 or a wireless access node 104), including a physical layer (PHY) entity or module (also called herein as just PHY layer, PHY module, or PHY entity) 202, a medium-access control (MAC) layer entity or module (also called herein as just MAC layer, MAC module, or MAC entity) 204, a radio-link control (RLC) layer entity or module (also called herein as just RLC layer, RLC entity, or RLC module) 206, a package data convergence protocol (PDCP) layer entity or module (also called herein as just PDCP layer, PDCP entity, or PDCP module) 208, and a service data adaptation protocol (SDAP)/radio resource control (RRC) layer entity or module (also called herein as just SDAP/RRC layer, SDAP/RRC entity, or SDAP/RRC module) 210.

In general, as used herein unless expressed otherwise, the terms "layer", "entity", and "module", used alone or in combination with each other, and as used for one or more components of a communication node, is an electronic device, such as electronic circuit, that includes hardware or a combination of hardware and software. In various embodiments, a module or an entity may be considered part of, or a component of, or implemented using one or more of the components of a communication node of FIG. 1, including a processor 110/120, a memory 112/122, a transceiver circuit 106/114, or the antenna 108/116. For example, the processor 110/120, such as when executing computer code stored in the memory 112/116, may perform the functions of a module or entity. Additionally, in various embodiments, the functions that a module or entity performs may be defined by one or more standards or protocols, such as 5G NR for example.

Additionally, the layer entities 202-210 in FIG. 2 may be higher (or upper) and lower layers relative to each other, with the PHY layer entity 202 being the lowest layer among the layer entities 202-210; the MAC layer entity 204 being a higher layer than the PHY layer entity 202 and lower than the other layer entities 206-210; the RLC layer entity 206 being higher than the PHY and MAC layer entities 202, 204 and lower than the PDCP and SDAP/RRC layer entities 208, 210; the PDCP layer entity 208 being higher than the PHY, MAC, and RRC layer entities 202-206 and lower than the SDAP/RRC layer entity 210; and the SDAP/RRC layer entity 210 being the highest layer entity among the layer entities 202-210 shown in FIG. 2. In various embodiments, a communication node of the system 100 may include modules and/or layer entities other than, including fewer than or more than, those shown in FIG. 2.

The layer entities or modules shown in FIG. 2 may be perform various functions and communicate with each other, such as by communicating signals, messages, or data packets between each other, in order to send and receive data packets. The PHY layer entity or module 202 may perform various functions, including encoding and decoding transport blocks to be transmitted to, or received from, another communication node; modulation and demodulation of data according to any of various modulation schemes or types, such as quadrature amplitude modulation (QAM) and quadrature phase shift keying (QPSK), as non-limiting examples; channel estimation on received data to determine channel state information on one or more channels on which the communication node receives signals; signal recovery of different signals, which the transmitting communication node may transmit on multiple antenna elements.

The MAC layer entity or module 204 may perform or handle logical-channel multiplexing and demultiplexing, hybrid automatic repeat request (HARQ) retransmissions, and scheduling-related functions, including the assignment of uplink and downlink resources in both the frequency domain and the time domain. Additionally, the MAC layer entity or module 204 may determine transport formats specifying how a transport block is to be transmitted. A transport format may specify a transport-block size, a coding and modulation mode, and antenna mapping. By varying the parameters of the transport format, the MAC layer entity or module 204 can effect different data rates. The MAC layer entity or module 204 may also control distributing data from flows across different component carriers or cells for carrier aggregation.

The RLC layer entity or module 206 may perform segmentation of service data units (SDU) to suitably sized protocol data units (PDU). In various embodiments, a data entity from/to a higher protocol layer or module is called a SDU, and the corresponding data entity to/from a lower protocol layer or module is called a PDU. The RLC layer entity or module 206 may also perform retransmission management that involves monitoring sequence numbers in PDUs in order to identify missing PDUs. Additionally, the RLC layer entity or module 206 may communicate status reports to enable retransmission of missing PDUs. The RLC layer entity or module 206 may also be configured to identify errors due to noise or channel variations.

The PDCP layer entity or module 208 may perform functions including, but not limited to, Internet Protocol (IP) header compression and decompression, ciphering and deciphering, integrity protection, retransmission management, in-sequence delivery, duplicate removal, dual connectivity, and handover functions.

The SDAP/RRC layer entity or module 210 may perform functions designated for a SDAP layer entity or module, including mapping traffic from quality of service (QoS) flows to suitable data radio bearers (DRBs), and/or perform functions designated for a RRC layer entity or module, including determining and/or controlling the determining of configurations for two communication nodes to communicate with each other, and configuring the lower layer entities or modules 202-208 according to the determined configuration. In some embodiments, the SDAP/RRC layer entity or module 210 may perform the functions of a SDAP layer entity and the functions of a RRC layer entity. In other embodiments, the SDAP/RRC layer entity 210 may perform the functions of a SDAP layer entity but not the functions of a RRC layer entity, or may perform the functions of a RRC layer entity but not a SDAP layer entity. For at least some of these embodiments, the SDAP/RRC layer entity 210 is a SDAP layer entity that performs the functions of a SDAP layer entity for configurations where the SDAP/RRC layer entity 210 is part of a data radio bearer (DRB), or is a RRC layer entity that performs the functions of a RRC layer entity for configurations where the SDAP/RRC layer entity is part of a signaling radio bearer (SRB). In still other embodiments, a communication node may organize or configure the SDAP/RRC layer entity 210 into two separate layer entities, including a SDAP layer entity and a RRC layer entity.

Additionally, in various embodiments, a communication node may have a protocol stack configuration that describes or identifies the layer entities of a communication node. A protocol stack may also describe or identify how the layer entities are organized or configured with respect to one or more radio bearers (RBs) of the communication node. In general, in a communication node, a radio bearer includes at least one layer entity. For at least some embodiments, the at least one layer entity may include one or more layers higher than the MAC layer entity. Also, multiple radio bearers of the same communication node may have layer entities of the same type. For example, multiple radio bearers of a communication node may each have a RLC layer entity. Also, in some embodiments, two radio bearers of a communication node may have one or more different layer entities from each other. For example, one radio bearer may include a SDAP layer entity and another radio bearer may include a RRC layer entity, or not. In addition, in various embodiments, two user devices configured to communicate with each other may have the same or different protocol stack configurations.

Additionally, in various embodiments, a wireless access node may have a protocol stack configuration for each user device with which the wireless access node is configured to communicate. The wireless access node's protocol stack configuration for a given user device may match the protocol stack configuration of the given user device, or at least a portion of the protocol stack configuration of the given user device.

Additionally, as described in further detail below, two user devices may establish an aggregation link between each other. The aggregation link may be between radio bearers of the two user devices and/or between two layer entities of the two user devices. A radio bearer with which a user device establishes an aggregation link is referred to as an aggregation radio bearer. Also, aggregation radio bearers that two communication nodes use to establish an aggregation link may be referred to as being associated with each other. The association may be configured by the wireless access node. For example, the wireless access node may determine the radio bearers of the two user devices that are to establish an aggregation link, and those radio bearers are aggregation radio bearers that are associated with each other. In addition or alternatively, two radio bearers of, or that are part of, a same user device may be associated with each other. Such two associated radio bearers of a same user device may be configured to communicate data packets between each other. In addition or alternatively, two user devices may establish an aggregation link between layer entities. For example, two user devices may establish an aggregation link between a first layer entity of the first user device and a second layer entity of the second user device. Two layer entities that two communication nodes use to establish an aggregation link may be referred to as being associated with each other. The association may be configured by the wireless access node, in various embodiments. Also, in some embodiments, one layer entity of one user device is a PDCP layer entity and the other layer entity of the other user device is a RLC layer entity. In other embodiments, both layer entities are PDCP layer entities. In still other embodiments, both layer entities are PHY layer entities. Additionally, for at least some embodiments, the layer entities between which an aggregation link is established are part of respective aggregation radio bearers. In addition or alternatively, two layer entities of, or that are part of, a same user device may be associated with each other. Such associated layer entities of a same user device may be configured to communicate data packets between each other.

Also, two user devices that establish an aggregation link may take on roles of a primary user device and a secondary user device. A secondary user device forwards data for the primary user device. For uplink transmissions, the secondary user device may receive data from the primary user device via the aggregation link, and then forward the received data to the wireless access node. For downlink transmissions, the secondary user device may receive data from the wireless access node and then forwards the received data to the primary user device via the aggregation link. For sidelink transmissions, the secondary user device may receive data from the primary user device via the aggregation link, and then forwards the received data to a third UE, or the secondary UE can receive data from the third UE and then forward the received data to the primary user device via the aggregation link. In various embodiments, there may be multiple secondary user devices, such that a primary user device simultaneously establishes multiple aggregation links each with a respective one of the multiple secondary user devices. In other embodiments, there may be multiple primary user devices, such that a secondary user device simultaneously establishes multiple aggregation links each with a respective one of the multiple primary user devices. Additionally, in various embodiments, a user device can be (take on the role of) both a primary user device and secondary user device, including at the same time.

FIGS. 3-8 show various example protocol stack configurations for a first user device 102(1), a second user device 102(2), and a wireless access node 104 configured to communicate with each other. Each of FIGS. 3-8 also show aggregation links established between associated layer entities and/or aggregation radio bearers of the two user devices 102(1), 102(1). Additionally, each of FIGS. 3-8 show uplink (UL) and downlink (DL) paths through the particular layer entities of the first and second user devices 102(1), 102(2) and the wireless access node 104. Also, the wireless access node 104 includes two protocol stack configurations 302, including a first protocol stack configuration 302(1) for, or corresponding to, the first user device 102(1) and a second protocol stack configuration 302(2) for, or corresponding to, the second user device 102(2). Further, as described in further detail below, for the embodiments in FIGS. 3-8, the first user device 102(1) performs the role of the primary user device and the second user device 102(2) performs the role of the secondary user device. In this context, the first user device 102(1) may also be referred to as the primary user device 102(1), and the second user device 102(2) may also be referred to as the secondary user device 102(2). Additionally, as shown in each of FIGS. 3-8, each of the UL path and the DL path terminate with the protocol stack configuration of the first user device 102(1) and the first protocol stack configuration for the first user device 302(1) of the wireless access node 104, and extend through the second protocol stack configuration 302(2) of the wireless access node and the protocol stack configuration of the second user device 102(2).

Figure 3:
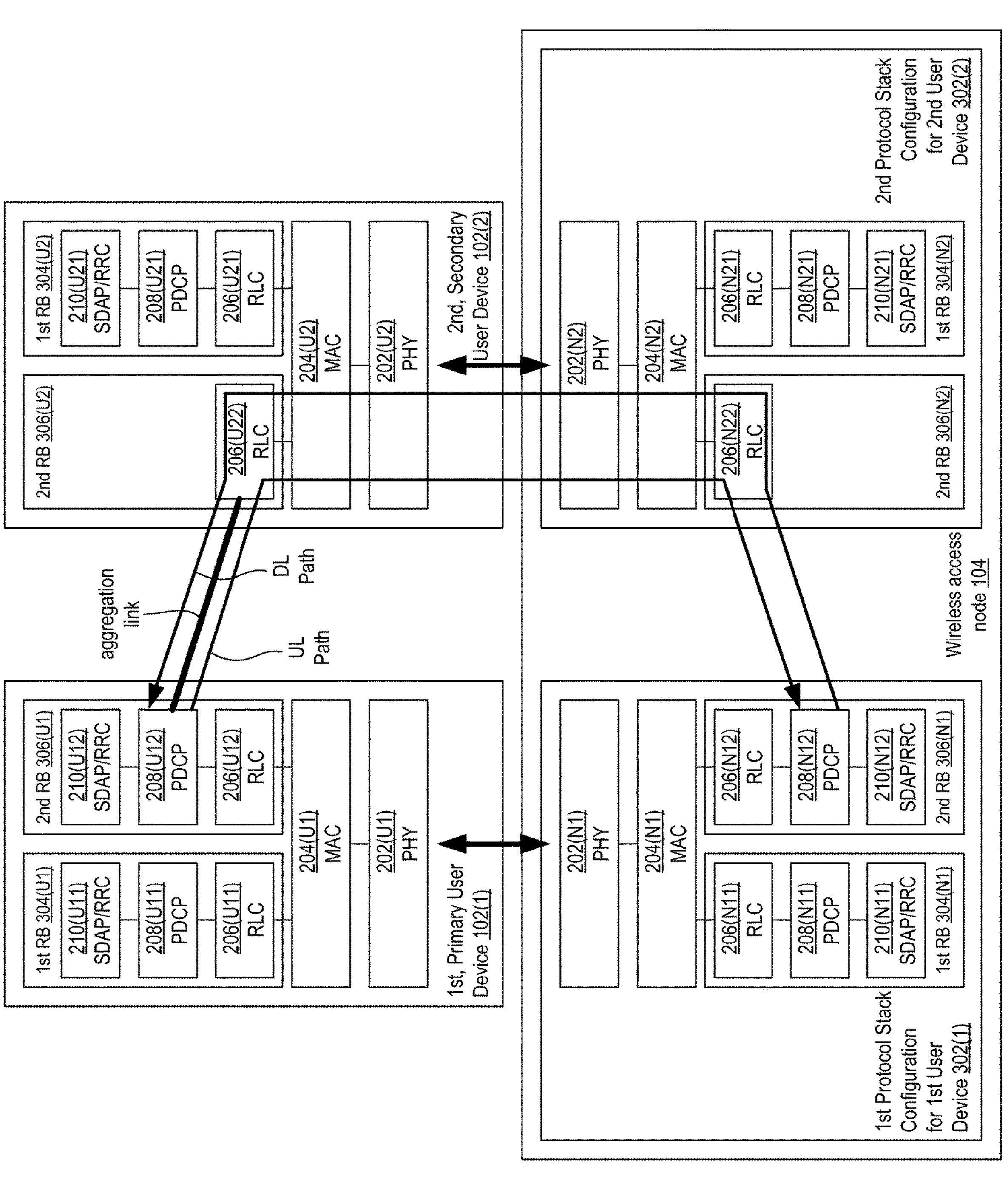
FIG. 3 shows a block diagram of example protocol stack configurations for a primary user device, a secondary user device, and a wireless access node.

Referring particularly to the embodiment shown in FIG. 3, each of the primary and secondary user devices 102(1), 102(2) includes two radio bearers (RB) 304, 306. Specifically, the primary user device 102(1) includes a first RB 304(U1) and a second RB 306(U1). Similarly, the secondary user device 102(2) includes a first RB 304(U2) and a second RB 306(U2). Correspondingly, the first and second protocol stack configurations 302(1), 302(2) of the wireless access node 104 each include two RBs 304, 306. The first protocol stack configuration 302(1) includes a first RB 304(N1) and a second RB 306(N1), and the second protocol stack configuration 302(2) includes a first RB 304(N2) and a second RB 306(N2).

Additionally, the primary and secondary user devices 102(1), 102(2) each include a PHY layer entity 202 and a MAC layer entity 204. The primary user device 102(1) includes a PHY layer entity 202(U1) and a MAC layer entity 204(U1), and the secondary user device 102(2) includes a PHY layer entity 202(U2) and a MAC layer entity 204(U2). Correspondingly, the first and second protocol stack configurations 302(1), 302(2) of the wireless access node 104 each include a PHY layer entity 202 and a MAC layer entity 204. The first protocol stack configuration 302(1) includes a PHY layer entity 202(N1) and a MAC layer entity 204(N1), and the second protocol stack configuration 302(2) includes a PHY layer entity 202(N2) and a MAC layer entity 204(N2).

Additionally, with respect to the primary user device 102(1), the first RB 304(U1) and the second RB 306(U1) each include a respective RLC layer entity 206(U11), 206(U12), a respective PDCP layer entity 208(U11), 208(U12), and a respective SDAP/RRC layer entity 210(U11), 210(U12). Correspondingly, for the first protocol stack configuration 302(1), the first and second RBs 304(N1), 306(N1) include respective RLC layer entities 206(N11), 206(N12), PDCP layer entities 208(N11), 208(N12), and SDAP/RRC layer entities 210(N11), 210(N12), which match the protocol stack configuration of the first and second RBs 304(U1), 304(U2) of the primary user device 102(1).

With respect to the secondary user device 102(2), the first RB 304(U2) includes a RLC layer entity 206(U21), a PDCP layer entity 208(U21), and a SDAP/RRC layer entity 210(U21). Also, the second RB 306(U2) only includes a RLC layer entity 206(U22). That is, it is not configured with a PDCP layer entity 208 or a SDAP/RRC layer entity 210. Correspondingly, in the second protocol stack configuration 302(2), the first RB 304(N2) includes a RLC layer entity 206(N21), a PDCP layer entity 208(N21), and a SDAP/RRC layer entity 210(N21), and the second RB 306(N2) includes a RLC layer entity 206(N22), but is not configured with a PDCP layer entity or a SDAP/RRC layer entity.

Additionally, for the primary user device 102(1), the first RB 304(U1) is used for "normal" transmission—i.e., uplink and downlink transmission between the primary user device 102(1) and the wireless access node 104, without using the second user device 102(2). The second RB 306(U1) is an aggregation RB that is used to establish an aggregation link with the second user device 102(2). Similarly, for the secondary user device 102(2), the second RB 304(U2) is used for "normal" transmission—i.e., uplink and downlink transmission between the secondary user device 102(2) and the wireless access node 104. The second RB 306(U2) is an aggregation RB that is used to establish an aggregation link with the primary user device 102(1). Accordingly, for at least some embodiments, the second RBs 306(U1), 306(U2) may be associated with each other. Additionally, the wireless access node 104 may configure the second, aggregation RBs 306(U1), 306(U2) to be associated with each other. In addition or alternatively, in various embodiments of the configuration in FIG. 3, the PDCP layer entity 208(U12) is associated with the RLC layer entity 206(U22). Through the association, the RLC layer entity 206(U22) of the secondary user device 102(2) provides the services for the PDCP layer entity 208(U12) of the primary user device 102(1).

Additionally, as shown in FIG. 3, the primary and secondary user devices 102(1), 102(2) establish an aggregation link between the PDCP layer entity 208(U12) of the primary user device 102(1) and the RLC layer entity 206(U22) of the secondary user device 102(2). Accordingly, logically, the PDCP layer entity 208(U12) of the primary user device 102(1) is connected to the RLC layer entity 206(U22) of the secondary user device 102(2).

The primary and secondary user device 102(1), 102(2) may be configured to communicate data packets between each other over the aggregation link. That is, over the aggregation link, the primary user device 102(1) may transmit data packets to the secondary user device 102(2), and/or the secondary user device 102(2) may transmit data packets to the primary user device 102(1). As described in further detail below, the aggregation link may include one or more data tunnels on which the data packets are communicated. In some embodiments, including those where the primary and secondary user devices 102(1), 102(2) each include more than one aggregation RB, the primary and secondary user device 102(1), 102(2) may establish multiple data tunnels for packet transmission. Each data tunnel may correspond to a pair of associated aggregation RBs, where one associated aggregation RB of the pair is in the primary user device 102(1) and the other associated aggregation RB of the pair is in the secondary user device 102(2). In turn, the primary and secondary user devices 102(1), 102(2) may transmit a data packet on a corresponding data tunnel in the aggregation link.

Additionally, in various embodiments, a data tunnel may be identified by a data tunnel index. In some embodiments, each data packet transmitted on a given data tunnel includes, indicates, and/or is labeled by a data tunnel index of the given data tunnel. The data packet may be transmitted together with the data tunnel index. For example, the data tunnel index may be part of a header of a data packet. As an example, the primary and secondary user devices 102(1), 102(2) may establish a first data tunnel 1 having a first data tunnel index 1 for the aggregation link between the PDCP layer entity 208(U12) and the RLC layer entity 206(U22). Correspondingly, the data tunnel index 1 is communicated together with the data packet between the PDCP layer entity 208(U12) and the RLC layer entity(U22).

In addition or alternatively, for a given data packet transmitted on a data tunnel of the aggregation link between a source aggregation RB to a target aggregation RB, the given data packet may be identified, indicated, and/or labeled by a source RB index of the source aggregation RB or the target RB index of the target aggregation RB. The data packet may be transmitted together with the source RB index or the target RB index. For example, the source RB index or the target RB index may be part of a header of a data packet. For example, for a given data packet transmitted from the PDCP layer entity 208(U12) of the primary user device 102(1) to the RLC layer entity 206(U22) of the secondary user device 102(2), the second RB 306(U1) is the source aggregation RB and the second RB 306(U2) is the target aggregation RB. The data packet may transmitted together with an index of the source aggregation RB 306 (U1) and/or an index of the target aggregation RB 306(U2).

Additionally, each data packet transmitted on a data tunnel may be identified by a packet index. A data packet may be transmitted together with its packet index. In various embodiments, the packet index may be part of a header of the data packet. Accordingly, a given data packet may be transmitted together with its packet index and at least one of: a data tunnel index, a source aggregation RB index, or a target aggregation RB index.

At the wireless access node 104 (the network side), the second RBs 306(N1), 306(N2) are associated with each other. In addition or alternatively, the PDCP layer entity 208(N12) of the first protocol stack configuration 302(1) for the primary user device 102(1) is associated with RLC layer entity 206(N22) of the second protocol stack configuration 302(2) for the secondary user device 102(2).

Figure 4:
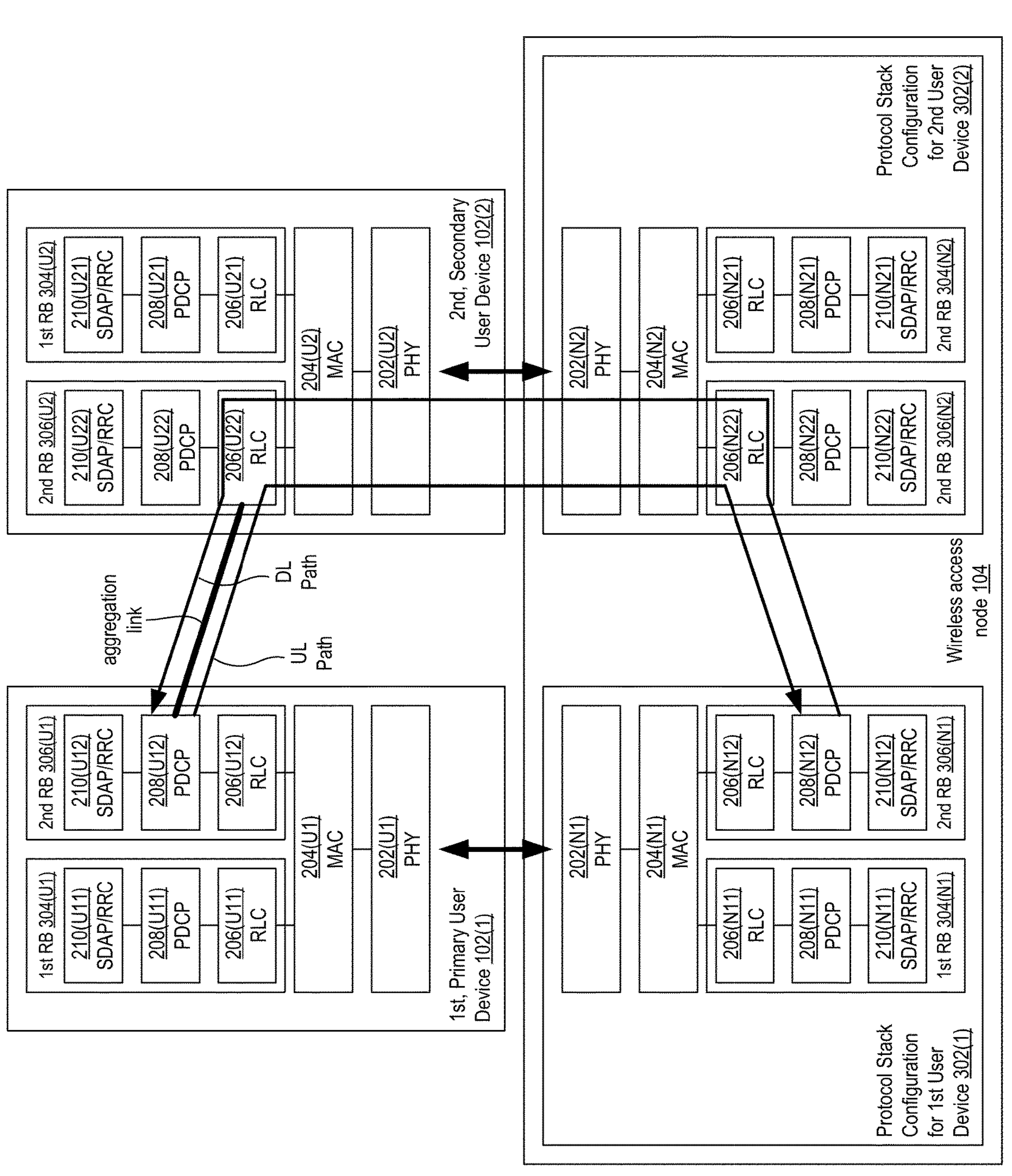
FIG. 4 shows a block diagram of second example protocol stack configurations for a primary user device, a secondary user device, and a wireless access node.

FIG. 4 shows another example embodiment of protocol stack configurations for a primary user device 102(1), a secondary user device 102(2), and a wireless access node 104. The embodiment shown in FIG. 4 is similar to the one shown in FIG. 3, except that second RB 306(U2) of the secondary user device 102(2) also includes a PDCP layer entity 208(U22) and a SDAP/RRC layer entity 210(U22). Correspondingly, second RB 306(N2) of the second protocol stack configuration 302(2) includes a PDCP layer entity 208(N22) and a SDAP/RRC layer entity 210(N22).

Figure 5:
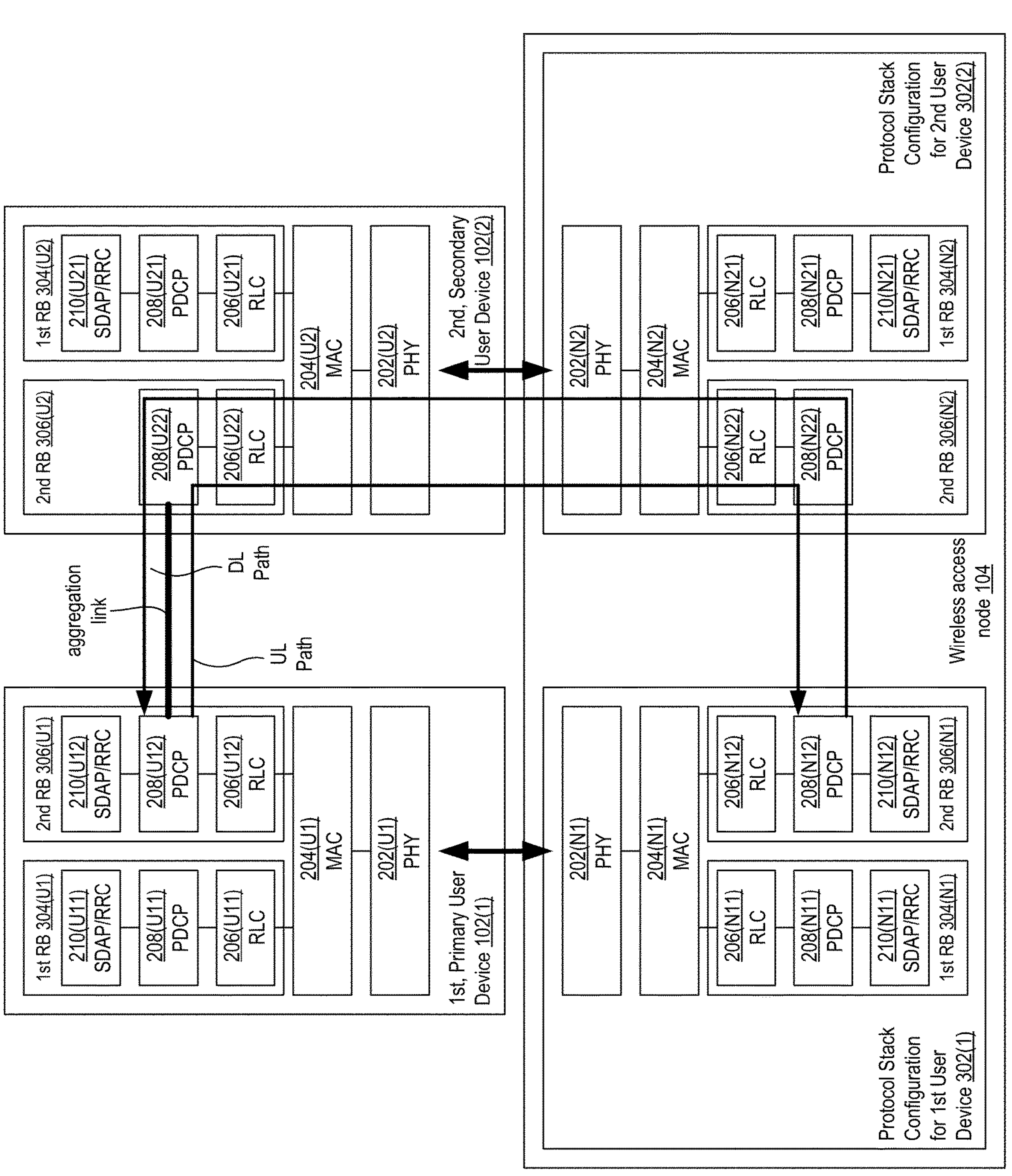
FIG. 5 shows a block diagram of third example protocol stack configurations for a primary user device, a secondary user device, and a wireless access node.

FIG. 5 shows another example embodiment of protocol stack configurations for a primary user device 102(1), a secondary user device 102(2), and a wireless access node 104. The embodiment shown in FIG. 5 is similar to the ones shown in FIGS. 3 and 4, except that the second RB 306(U2) of the secondary user device 102(2) is configured with a RLC layer entity 206(U22) and a PDCP layer entity 208 (U22), but not a SDAP/RRC layer entity 210. Correspondingly, the second RB 206(N2) of the wireless access node 104 is configured with a RLC layer entity 206(N22) and a PDCP layer entity 208(N22), but not a SDAP/RRC layer entity 210.

Also, for the configuration in FIG. 5, the primary and secondary user devices 102(1), 102(2) establish an aggregation link between respective PDCP layer entities—i.e., between the PDCP layer entity 208(U12) of the primary user device 102(1) and the PDCP layer entity 208(U22) of the secondary user device 102(2). The PDCP layer entity 208 (U12) may also be referred to as a primary PDCP layer entity 208(U12), and the PDCP layer entity 208(U22) may also be referred to as a secondary PDCP layer entity 208(U12). Correspondingly, the wireless access node 104 may establish a connection or association between PDCP layer entities of the protocol stack configurations 302(1), 302(2), as shown in FIG. 5.

Also, for at least some embodiments, including the one shown in FIG. 5, a data packet communicated between primary and secondary PDCP layer entities 208(U12), 208 (U22) may identify, indicate, and/or be labeled by a source PDCP layer entity index or a target PDCP layer entity index. For a transmission of a data packet from the primary PDCP layer entity 208(U12) to the secondary PDCP layer entity 208(U22), the primary PDCP layer entity 208(U12) is the source PDCP layer entity having a source PDCP entity index, and the secondary PDCP layer entity 208(U22) is the target PDCP layer entity having a target PDCP entity index. Additionally, for a transmission of a data packet from the secondary PDCP layer entity 208(U22) to the primary PDCP layer entity 208(U12), the secondary PDCP layer entity 208(U22) is the source PDCP layer entity having a source PDCP entity index, and the primary PDCP layer entity 208(U12) is the target PDCP layer entity having a target PDCP entity index.

FIG. 6 shows another example embodiment of protocol stack configurations for a primary user device 102(1), a secondary user device 102(2), and a wireless access node 104. The embodiment shown in FIG. 6 is similar to the one shown in FIG. 5, except that the second RB 306(U2) of the secondary user device 102(2) also includes a SDAP/RRC layer entity 210(U22). Correspondingly, second RB 306 (N2) of the second protocol stack configuration 302(2) includes a SDAP/RRC layer entity 210(N22).

Figure 7:
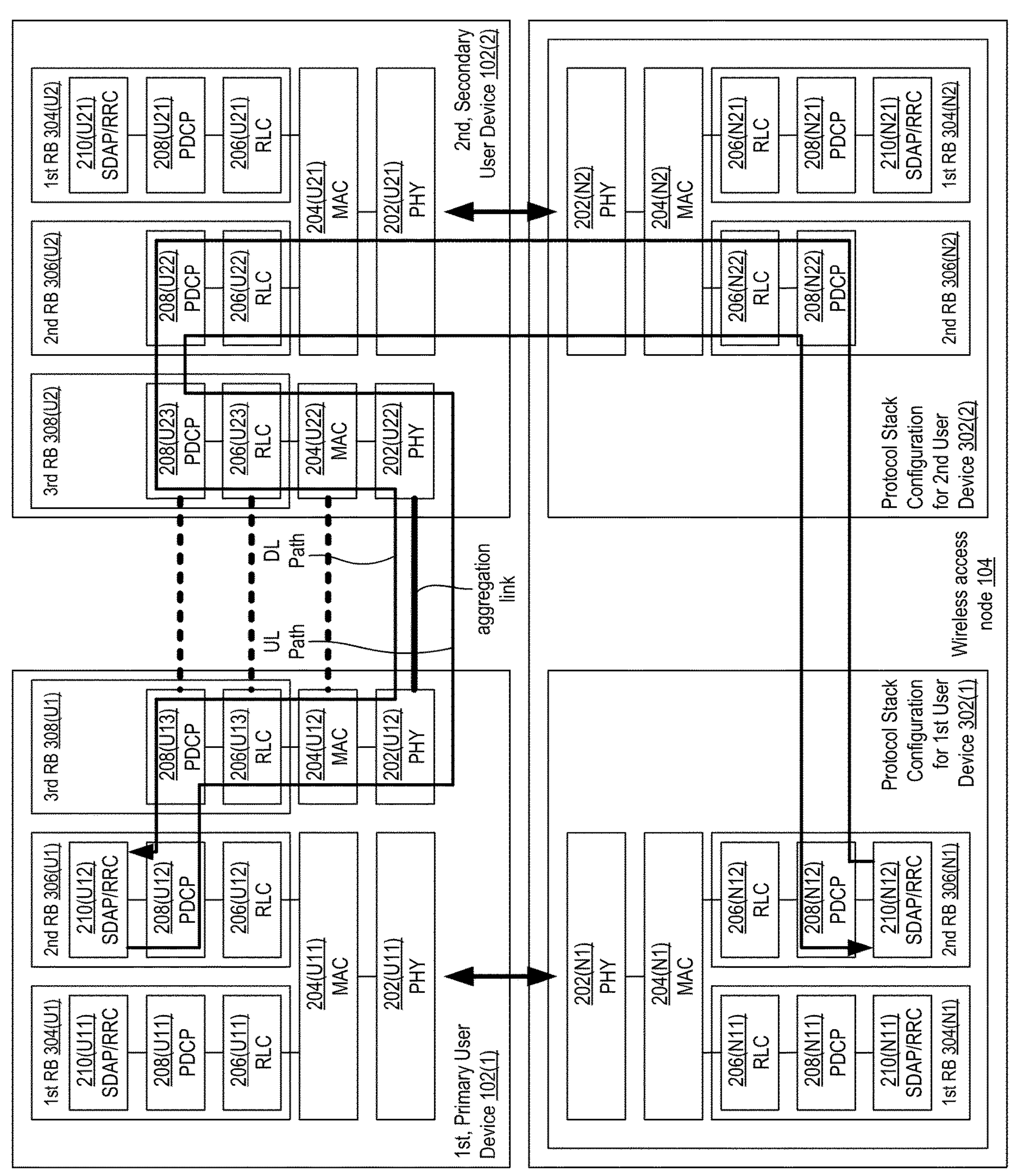
FIG. 7 shows a block diagram of fifth example protocol stack configurations for a primary user device, a secondary user device, and a wireless access node.

FIG. 7 shows another example embodiment of protocol stack configurations for a primary user device 102(1), a secondary user device 102(2), and a wireless access node 104. The embodiment shown in FIG. 7 is similar to the ones shown in FIGS. 3-6, except that each of the primary and secondary user devices 102(1), 102(2) includes an additional, third RB 308(U1), 308(U2). The primary user device 102(1) may use the first and second RBs 304(U1), 306(U1) for "normal" transmission—i.e., for uplink and downlink transmission with the wireless access node 104. Similarly, the secondary user device 102(2) may use the first and second RBs 304(U2), 306(U2) for "normal" transmission—i.e., for uplink and downlink transmission with the wireless access node 104. Additionally, the third RBs 308(U1), 308(U2) may be associated with each other for communication between the primary and secondary user devices 102(1), 102(2). The third RBs 308(U1), 308(U2) may include respective RLC layer entities 206(U13), 206(U23) and respective PDCP layer entities 208(U13), 208(U23).

In addition, in the example configuration in FIG. 7, each of the primary and secondary user devices 102(1), 102(2) include two PHY layer entities 202 and two MAC layer entities 204. For the primary user device 102(1), the first and second RBs 304(U1), 306(U1) are configured to communicate with first PHY and MAC layer entities 202(U11), 204(U11), and the third RB 308(U1) is configured to communicate with second PHY and MAC layer entities 202 (U12), 204(U12). Similarly, for the secondary user device 102(2), the first and second RBs 304(U2), 306(U2) are configured to communicate with first PHY and MAC layer entities 202(U21), 204(U21), and the third RB 308(U2) is configured to communicate with second PHY and MAC layer entities 202(U22), 204(U22).

Additionally, the second RB 306(U1) may be configured to be associated with the third RB 308(U1) in the primary user device 102(1). Similarly, the second RB 306(U2) may be configured to be associated with the third RB 308(U2) in the secondary user device 102(2). For at least some embodiments, the association may be configured by the wireless access node 104.

Also, in the embodiment shown in FIG. 7, the primary and secondary user devices 102(1), 102(2) may establish an aggregation link between respective PHY layer entities 202(U12), 202(U22), or alternatively, between respective MAC layer entities 204(U12), 204(U22), respective RLC layer entities 206(U13), 206(U23), or respective PDCP layer entities 208(U13), 208(U23), as indicated by the dotted lines in FIG. 7.

Figure 8:
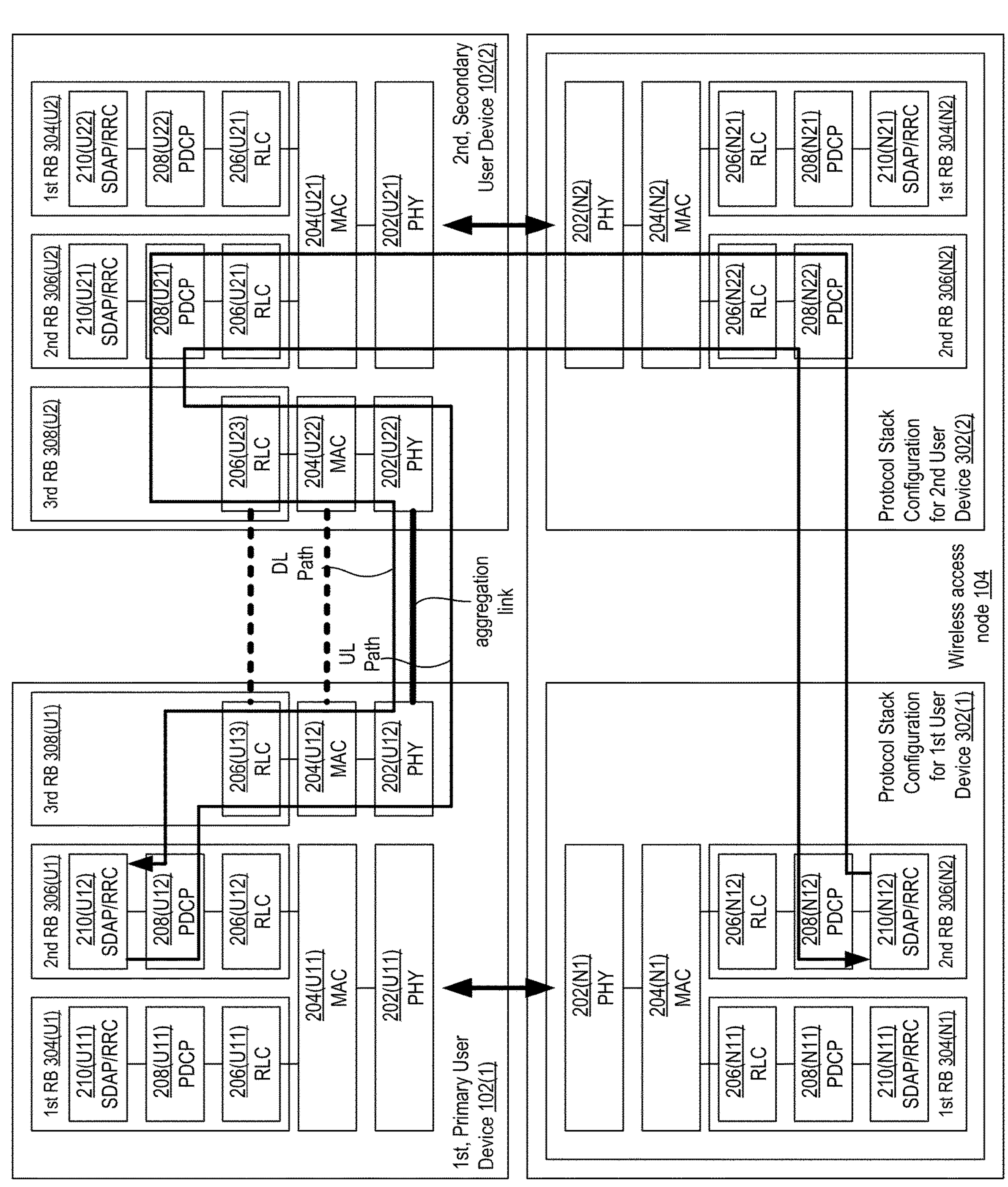
FIG. 8 shows a block diagram of sixth example protocol stack configurations for a primary user device, a secondary user device, and a wireless access node.

FIG. 8 shows another example embodiment of protocol stack configurations for a primary user device 102(1), a secondary user device 102(2), and a wireless access node 104. The embodiment shown in FIG. 8 is similar to the one shown in FIG. 7, except that the third RBs 308(U1), 308(U2) are not configured with respective PDCP layer entities 208(U13), 208(U23), and the second RB 306(U2) of the secondary user device 102(2) is configured with a SDAP/RRC layer entity 210(U21).

Figure 9:
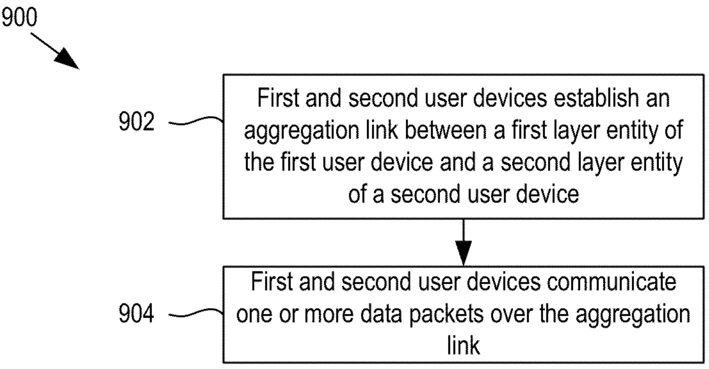
FIG. 9 shows a flow chart of an example method for wireless communication.

FIG. 9 shows an example method 900 for wireless communication. The method 900 is described with reference to the first and second user devices 102(1), 102(2) configured as primary and secondary user devices, respectively, and the wireless access node 104. At block 902, the first and second user devices 102(1), 102(2) may establish an aggregation link between a first layer entity of the first user device 102(1) and a second layer entity of the second user device 102(2). In some embodiments, such as shown in FIGS. 3 and 4, the first layer entity of the first user device 102(1) is the PDCP layer entity 208(U12) and the second layer entity of the of the second user device 102(2) is the RLC layer entity 206(U22). In other embodiments, such as shown in FIGS. 5 and 6, the first and second layer entities are the PDCP layer entities 208(U12), 208(U22). In still other embodiments, such as shown in FIGS. 7 and 8, the first and second layer entities are the PHY layer entities 202, the MAC layer entities 204, or the RLC layer entities 206.

At block 904, the first and second user devices 102(1), 102(2) may communicate one or more data packets over the aggregation link. For example, the first layer entity of the first user device 102(1) may transmit the one or more data packets to the second layer entity of the second user device 102(2) over the aggregation link. Alternatively, the second layer entity of the second user device 102(2) may transmit the one or more data packets to the to the first layer entity of the first user device 102(1) over the aggregation link.

Figure 10:
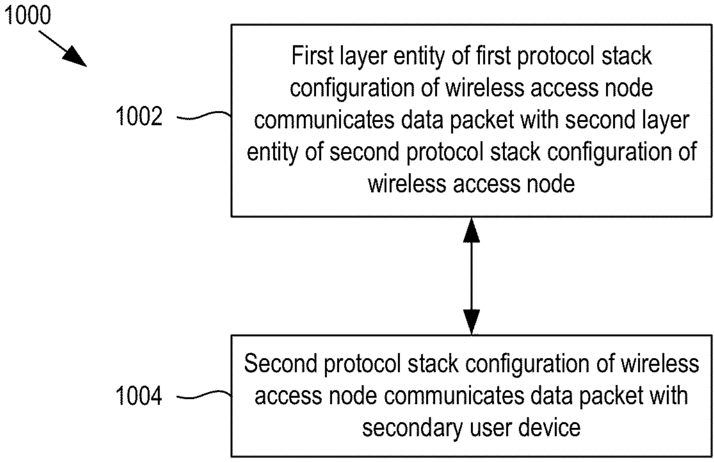
FIG. 10 shows a flow chart of an example method for wireless communication.

FIG. 10 shows an example method 1000 for wireless communication. The method 1000 is described with reference to the wireless access node 104, and further with the first user device 102(1) configured as a primary user device and the second user device 102(2) configured as a secondary user device. At block 1002, a first layer entity of the first protocol stack configuration 302(1) of the wireless access node 104 may communicate with a second layer entity of the second protocol stack configuration 302(2) of the wireless access node 104. In some embodiments, the first layer entity is a PDCP layer entity (e.g., PDCP layer entity 208(N12), and the second layer entity is a RLC layer entity (e.g., RLC layer entity 206(N22). In other embodiments, the first layer entity and the second layer entity are both PDCP layer entities (e.g., PDCP layer entity 208(N12) and PDCP layer entity 208(N22)). At block 1004, the second protocol stack configuration 302 may communicate the data packet with the secondary user device 102(2).

The data packet communicated in the method 1000 may be for a transmission between the wireless access node 104 and the primary user device 102(1). In some embodiments, the transmission is a downlink transmission. For such embodiments, block 1002 may be performed before block 1004. At block 1002, the first layer entity of the first protocol stack configuration 302(1) may deliver the data packet to the second layer entity of the second protocol stack configuration 302(2). At block 1004, the second protocol stack configuration 302(2) may transmit the data packet to the secondary user device 102(2). In other embodiments, the transmission is an uplink transmission. For such embodiments, block 1004 may be performed before block 1002. At block 1004, the second protocol stack configuration 302(2) receives the data packet from the second user device 102(2). At block 1002 (performed after block 1004), the second layer entity of the second protocol stack configuration 302(2) delivers the data packet to the first layer entity of the first protocol stack configuration 302(1).

Various embodiments of the method 900 and the method 1000 are now described with particular reference to the protocol stack configurations of FIGS. 3-8.

With reference to the embodiment in FIG. 3, for embodiments where the communication at block 904 is for an uplink transmission, the PDCP layer entity 208(U12) of the primary user device 102(1) may deliver the data packet as a PDCP protocol data unit (PDU) to either the RLC layer entity 206(U12) of the primary user device 102(1) or the RLC layer entity 206(U22) of the secondary user device 102(2) via the aggregation link. If the primary user device 102(1) is configured for PDCP duplication, the PDCP layer entity 208(U12) of the primary user device 102(1) may deliver the PDCP PDU to both the RLC layer entity 206(U12) of the primary user device 102(1) and the RLC layer entity 206(U22) of the secondary user device 102(2) via the aggregation link. In event there is no RLC layer entity of the aggregation RB 306(U1) in the primary user device 102(1), the PDCP layer entity 208(U12) of the aggregation RB 306(U1) of the primary user device 102(1) may deliver all data packet (PDCP PDUs) to the RLC layer entity 206(U22) of the secondary user device 102(2) via the aggregation link.

When the secondary user device 102(2) receives a data packet via the aggregation link, the RLC layer entity 206(U22) of the second user device 102(2) may consider the data packet as a PDCP PDU. Also, if the secondary user device 102(2) receives a data packet on a data tunnel in the aggregation link, the secondary user device 102(2) delivers the data packet to the RLC layer entity 206(U22) of the second, aggregation RB 306(U2), where the data tunnel corresponds to the second aggregation RB 306(U2).

In addition, in various embodiments at block 904 with respect to the configuration of FIG. 3, the secondary user device 102(2) may receive a data packet via the aggregation link. If the data packet is labeled by a target radio bearer index, the data packet is delivered to the RLC layer entity of the radio bearer having the target radio bearer index. For example, if the data packet is labeled by a target radio bearer index of the second RB 306(U2), then the secondary user device 102(2) delivers the data packet to the RLC layer entity 206(U22). The RLC layer entity receiving the data packet may perform corresponding operations once it receives the PDCP PDU.

Additionally, for embodiments where the data packet is received from the PDCP layer entity 208(U12) of the primary user device 102(1), the RLC layer entity 206(U22) of the secondary user device 102(2) may feedback an indication of a successful delivery status to the associated PDCP layer entity 208(U12) of the primary user device 102(1). The successful delivery status indicates whether or not the data packet is successfully received. For example, in various embodiments, a specific data packet delivered from the RLC layer entity 206(U22) of the secondary user device 102(1) to the PDCP layer entity 208(U12) of the primary user device 102(1) may indicate a packet index and a bitmap. The bitmap may include a plurality of digits. The number of digits may correspond to a certain number of a set of data packets, with there being a one-to-one correspondence or mapping between the digits and the data packets. Each digit may indicate whether or not a corresponding data packet was successfully received. The packet index may indicate a first or starting data packet of the set of data packets. In various embodiments, for a given digit, a bit value of '1' indicates that the corresponding data packet has been successfully delivered, and a bit value of '0' indicates that the corresponding data packet has not been successfully delivered. To illustrate, suppose a specific packet indicates a packet index 103 and a bitmap '11110011', which indicates that data packets with indices 103, 104, 105, 106, 109 and 110 have been successfully delivered, and data packets with indices 107 and 108 have not been successfully delivered.

Additionally, in various embodiments, for a data packet delivered to the RLC layer entity 206(U22) of the secondary user device 102(1), the PDCP layer entity 208(U12) of the primary user device 102(1) may indicate to the RLC layer entity 208(U22) to discard the data packet. For example, the PDCP layer entity 208(U12) of the primary user device 102(1) may send a specific packet to the RLC layer entity 206(U22) of the secondary user device 102(2) indicating whether the data packet should be discarded. The specific packet may indicate one or more indices of one or more data packets to be discarded by the RLC layer entity 206(U22) of the secondary user device 102(2).

Additionally, for downlink transmissions, the secondary user device 102(2) may receive data from the wireless access node 104, such as at block 1004. Upon receipt of the data packet, the RLC layer entity 206(U22) of the second, aggregation RB 306(U2) in the secondary user device 102(2) may process the data packet. After processing, the RLC layer entity 206(U22) may deliver the data packet, which include a RLC PDU or a RLC service data unit (SDU), to the primary user device 102(1) via the aggregation link. For example, the RLC layer entity 206(U22) delivers the RLC PDU or RLC SDU to the associated PDCP layer entity 208(U12) via the corresponding data tunnel. In some embodiments, the delivered data packet (RLC PDU or RLC SDU) is labeled by a data tunnel index and packet index in its packet header. In other embodiments, the delivered data packet (RLC PDU or RLC SDU) is labeled by a source radio bearer index or target radio bearer index and a packet index in its packet header.

In some embodiments, the RLC layer entity 206(U12) may not be included in the second, aggregation RB 306(U1) of the primary user device 102(1). However, the second, aggregation RB 306(U1) may include the PDCP layer entity 208(U12) and the SDAP/RRC layer entity 210(U12). Accordingly, the second RB 306(N1) in the wireless access node 104 (i.e., at the network side) for the first protocol stack configuration 302(1) includes the PDCP layer entity 208(N12) and the SDAP/RRC layer entity 210(N12). Correspondingly, the PDCP layer entity 208(U12) may deliver all PDCP PDUs to the RLC layer entity 206(U22) of the secondary user device 102(2) via the aggregation link. Similarly, the PDCP layer entity 208(N12) at the network side delivers all PDCP PDUs to the RLC layer entity 206(N22) of the second protocol stack configuration 302(2).

With respect to the embodiment in FIG. 4, The PDCP layer entity 208(U12) is connected to the RLC layer entity 206(U22) via the aggregation link. Additionally, the RLC layer entity 206(U22) is connected to both the PDCP layer entity 208(U22) of the secondary user device 102(2) and the PDCP layer entity 208(U22) of the primary user device 102(1).

Accordingly, when the RLC layer entity 206(U22) receives a data packet from the PDCP layer entity 208(U12) of the primary user device 102(1) or the PDCP layer entity 208(U22) of the secondary user device 102(2), the data packet may indicate or be labeled by an index, such as included in a field in the header of the data packet, that is used to indicate the PDCP layer entity (the PDCP layer entity 208(U12) or the PDCP layer entity 208(U22) from which the packet is received. A first value (e.g., a value of '1') indicates that the PDCP entity of a data packet is the PDCP layer entity 208(U12) of the primary user device 102(1), and a second value (e.g., a value of '0') indicates that the PDCP entity of the data packet is the PDCP layer entity 208(U22) of the secondary user device 102(2). Correspondingly, if the data packet is from the PDCP layer entity 208(U12) of the primary user device 102(1), the value of the index or field is set to the first '1' value for the packet, and if the packet is from the PDCP layer entity 208(U22) of the secondary user device 102(2), the value of the index or field is set to second '0' value for the packet. When the RLC layer entity 206(U22) of the secondary user device 102(2) receives a data packet from the (lower) MAC layer entity 204(U2), if the packet has its index or field set to the first '1' value, the packet is delivered to the PDCP layer entity 208(U12) after processing, and if the packet has its index or field set to the second '0' value, the packet is delivered to the PDCP layer entity 208(U22) after processing. At the network side, data packets received by the RLC layer entity 206(N22) may be similarly labeled with an index or field indicating the PDCP layer entity 208(N12) of the first protocol stack configuration or the PDCP layer entity 208 (N22) of the second protocol stack configuration, and the RLC layer entity 206(N22) may route the data packet to the PDCP layer entity 208(N22) or the PDCP layer entity 208(N12) accordingly.

With respect to the embodiment of FIG. 5, a packet delivered from the primary PDCP layer entity 208(U12) to the secondary PDCP layer entity 208(U22) may be indicated or labeled by a primary PDCP entity index as a source radio bearer index, or indicated or labeled by a secondary PDCP entity index as the target radio bearer index. Additionally, a packet delivered from the secondary PDCP layer entity 208(U22) to the primary PDCP layer entity 208(U12) may be indicated or labeled by the secondary PDCP entity index as the source radio bearer index, or indicated or labeled by the primary PDCP entity index as the target radio bearer index.

In primary user device 102(1), when the primary PDCP layer entity 208(U12) receives a PDCP SDU from an the upper layer (SDAP/RRC layer entity 210(U12)), the PDCP SDU may be delivered from the primary PDCP entity 208(U12) to the secondary PDCP entity 208(U22) via the aggregation link. A COUNT value may be allocated by the primary PDCP entity 208(U12) for the PDCP PDU. The allocated COUNT value may be delivered from the primary PDCP entity 208(U12) to the secondary PDCP entity 208 (U22) together with the PDCP SDU.

In the secondary user device 102(2), when the secondary PDCP layer entity 208(U22) receives the PDCP SDU and the COUNT value from the primary PDCP entity 208(U12), the received PDCP SDU is seen by the secondary PDCP layer entity 208(U22) as its PDCP SDU for further processing. The secondary PDCP layer entity 208(U22) may perform at least one of: header compression, integrity protection, or ciphering using the received COUNT value. After processing, the outputted data packet may be delivered from the secondary PDCP layer entity 208(U22) to a lower layer entity (e.g., the RLC layer entity 206(U22). The secondary PDCP layer entity 208(U22) may not need to maintain the state variable TX_NEXT, which indicates the COUNT value of a next PDCP SDU to be transmitted.

Also, in the secondary user device 102(2), when the secondary PDCP layer entity 208(U22) receives a PDCP PDU from a lower layer entity (e.g., the RLC layer entity 206(U22)), the PDCP PDU may be processed by the secondary PDCP layer entity 208 (U22). After processing, the outputted packet is a PDCP SDU. The COUNT value corresponding to the PDCP SDU may be determined by the secondary PDCP layer entity 208(U22). If the secondary PDCP layer entity 208(U22) is configured with a state variable RX_DELIV, the COUNT value is determined by a sequence number (PDCP SN) of the received PDCP PDU and the state variable RX_DELIV. Additionally, the secondary PDCP layer entity 208(U22) may discard the PDCP SDU when the COUNT value corresponding to the PDCP SDU is less than the RX_DELIV value. The variable RX_DELIV indicates that the COUNT value of the first PDCP SDU is not delivered to the upper layers, but still waited for.

Additionally, the PDCP SDU and the corresponding COUNT value may be delivered from the secondary PDCP layer entity 208(U22) to the primary PDCP layer entity 208(U12), instead of being discarded, such as in response to the COUNT value being greater than or equal to the state variable RX_DELIV. The secondary PDCP layer entity 208(U22) may first process the PDCP SDU, such as by performing at least one of header decompression, integrity verification, or deciphering based on the COUNT value, and then may deliver the PDCP SDU to the primary PDCP layer entity 208(U12). In response, the primary PDCP layer entity 208(U12) may deliver the received PDCP SDU to the upper layer (e.g., the SDAP/RRC layer entity 210(U12)). The primary PDCP layer entity 208(U12) may update its state variables by using the received COUNT value.

Also, in event that the secondary PDCP layer entity 208(U22) does not have the state variable RX_DELIV, the COUNT value may be determined by the sequence number PDCP SN of the received PDCP PDU and a HPN value. For example, the COUNT=[HFN, PDCP SN]. The HPN value is delivered by the primary PDCP layer entity 208(U12) to the secondary PDCP layer entity 208(U22). The PDCP SDU and the corresponding COUNT value may be delivered from the secondary PDCP layer entity 208(U22) to the primary PDCP layer entity 208(U12). The primary PDCP layer entity 208(U12) may perform operations according to the received COUNT value, including discard the PDCP SDU or delivering the received PDCP SDU to the upper layer (e.g., SDAP/RRC layer entity 210).

In other embodiments, in the primary user device 102(1), when the primary PDCP layer entity 208(U12) receives a PDCP SDU from the upper layer (e.g., the SDAP/RRC layer entity 210(U12)), the PDCP SDU is processed by the primary PDCP layer entity 208(U12). After processing, the outputted packet is a PDCP PDU, which may be delivered from the primary PDCP layer entity 208(U12) to the secondary PDCP layer entity 208(U22) via the aggregation link. In the secondary user device 102(2), when the secondary PDCP layer entity 208(U22) receives the PDCP PDU from the primary PDCP layer entity 208(U12), the received PDCP PDU is seen by the secondary PDCP layer entity 208(U22) as its PDCP SDU for further processing. The processing includes at least one of header compression, integrity protection, or ciphering. Header compression may not be needed for the PDCP SDU in the secondary PDCP layer entity 208(U22). After processing, the outputted packet is delivered from the secondary PDCP layer entity 208(U22) to the lower layer (e.g., the RLC layer entity 206(U22)).

When the secondary PDCP entity 208(U22) receives a PDCP PDU from the lower layer (e.g., the RLC layer entity 206(U22)), the PDCP PDU is processed by the secondary PDCP layer entity 208(U22). The processing includes at least one of header decompression, integrity verification, or deciphering. Header decompression may not be needed for the PDCP PDU in the secondary PDCP layer entity 208(U22). After processing, the outputted packet is a PDCP SDU. The PDCP PDU may be delivered from the secondary PDCP layer entity 208(U22) to the primary PDCP layer entity 208(U12) via the aggregation link. In the primary user device 102(1), from the perspective of the primary PDCP layer entity 208(U12), the received PDCP SDU is seen by the primary PDCP entity 208(U12) as its PDCP PDU for further processing. After processing, the outputted packet is delivered from the primary PDCP layer entity 208(U12) to the upper layer (e.g., the SDAP/RRC layer entity 210(U12)).

In some embodiments, the RLC layer entity may not be included in the second, aggregation RB 306(U1) of the primary user device 102(1). However, the second, aggregation RB 306(U1) may include the PDCP layer entity 208(U21) and the SDAP/RRC layer entity 210(U12). Accordingly, the second RB 306(N1) of the first protocol stack configuration 302(1) of the wireless access node 104 includes the PDCP layer entity 208(N12) and the SDAP/RRC layer entity 210(N12). For such embodiments, the primary PDCP layer entity 208(U12) may deliver all PDCP PDUs or PDCP SDUs to the secondary PDCP layer entity 208(U22) via the aggregation link. Similarly, at the network side, the PDCP layer entity 208(N12) may deliver all the PDCP PDUs or PDCP SDUs to the PDCP layer entity 208(N22), such as at block 1002.

With respect to the embodiment in FIG. 6, the primary PDCP layer entity 208(U12) is connected to the secondary PDCP layer entity 208(U22). Correspondingly, the secondary PDCP layer entity 208(U22) connected to both the primary PDCP layer entity 208(U12) and the SDAP/RRC layer entity 210(U22) of the secondary user device 102(2). When the secondary PDCP layer entity 208(U22) receives a packet from the primary PDCP layer entity 208(U12) or the SDAP/RRC layer entity 210(U22), the packet may be labeled by a field or index, such as in a header of the packet, used to indicate the source entity of the packet. A value of the field or index may include a first '1' value that indicates that the source entity of the packet is the primary PDCP layer entity 208(U12), or may include a second '0' value that indicates that the source entity of the packet is the SDAP/RRC layer entity 210(U22).

Correspondingly, if the packet is from the primary PDCP layer entity 208(U12), the value of the field or index is set to the first '1' value for the packet, and if the packet is from the SDAP/RRC layer entity 210(U22), the value of the field or index is set to the second '0' value for the packet. When the secondary PDCP layer entity 208(U22) receives a packet from the lower layer (the RLC layer entity 206(U22), the secondary PDCP layer entity 208(U22) may deliver the packet to the primary PDCP layer entity 208(U12) if its field is set to first '1' value after processing, and may deliver the packet to the SDAP/RRC layer entity 210(U22) if its field is set to the second '0' value after processing. Similarly, at the network side, when the PDCP layer entity 208(N22) receives a packet from the RLC layer entity 206(N22), the PDCP layer entity 208(N22) may deliver the packet to either the PDCP layer entity 206(N12) or the SDAP/RRC layer 210(N22), depending whether the index or field of the packet has a first '1' value or a second '0' value.

With respect to the embodiment of FIG. 7, when the PDCP layer entity 208(U13) of the third, aggregation RB 308(U1) receives a PDCP PDU from the lower layer (e.g., the RLC layer entity 206(U13), the PDCP PDU is processed by the PDCP layer entity 208(U13). The processing includes at least one of header decompression, integrity verification, or deciphering. After processing, the outputted packet is a PDCP SDU, which is delivered from the PDCP layer entity 208(U13) to the PDCP layer entity 208(U12) of the second RB 306(U1).

Additionally, when the PDCP layer entity 208(U12) of the second RB 306(U1) may receive a PDCP SDU from the PDCP layer entity 208(U13), the PDCP SDU may be considered as a PDCP PDU for the PDCP layer entity 208(U12) of the second RB 306(U1) to process. The processing includes at least one of header decompression, integrity verification, or deciphering. After processing, the outputted packet is a PDCP SDU, which is delivered to the upper layer (e.g., the SDAP/RRC layer entity 210(U12)).

Additionally, when the PDCP layer entity 208(U12) of the second RB 306(U1) receives a PDCP SDU from the upper layer (e.g., the SDAP/RRC layer entity 210(U12)), the PDCP SDU is processed by the PDCP layer entity 208(U12). The processing includes at least one of header compression, integrity protection, or ciphering. After processing, the outputted packet is a PDCP PDU, which is delivered from the PDCP layer entity 208(U12) to the PDCP layer entity 208(U13) of the third RB 308(U1). When the PDCP layer entity 208(U13) of the third RB 308(U1) may receive a PDCP SDU from the PDCP layer entity 208(U12), the PDCP SDU may be considered as a PDCP PDU for the PDCP layer entity 208(U13) of the third RB 308(U1) to process. The processing includes at least one of header compression, integrity protection, or ciphering. After processing, the outputted packet is a PDCP SDU, which is delivered to the lower layer (e.g., the RLC layer entity 206(U13)).

In the secondary user device 102(2), when the PDCP layer entity 208(U23) of the third, aggregation RB 308(U2) receives a PDCP PDU from the lower layer entity (e.g., the RLC layer entity 206(U23)), the PDCP PDU may be processed by the PDCP layer entity 208(U23) of the third, aggregation RB 308(U2). The processing includes at least one of header decompression, integrity verification, or deciphering. After processing, the outputted packet is a PDCP SDU, which is delivered from the PDCP layer entity 208(U23) of the third, aggregation RB 308(U2) to the PDCP layer entity 208(U22) of the second RB 206(U2). From the PDCP layer entity 208(U22) of the second RB 306(U2), the received PDCP SDU is seen by the PDCP layer entity 208(U22) as its SDU for further processing. The processing includes at least one of header compression, integrity protection, or ciphering. After processing, the outputted packet is a PDCP PDU, which is delivered from the PDCP layer entity 208(U22) of the second RB 306(U2) to the lower layer entities (e.g., the RLC layer entity 206(U22)).

Also, in the secondary user device 102(2), when the PDCP layer entity 206(U22) of the second RB 306(U2) receives a PDCP PDU from the lower layer entities (e.g., the RLC layer entity 206(U22)), the PDCP PDU is processed by the PDCP layer entity 208(U22) of the second RB 306(U2). The processing includes at least one of header decompression, integrity verification, or deciphering. After processing, the outputted packet is a PDCP SDU, which is delivered from the PDCP layer entity 206(U22) of the second RB 306(U2) to the PDCP layer entity 208(U23) of the third, aggregation RB 308(U2). From the PDCP layer entity 208(U23) of the third aggregation RB 308(U2), the received PDCP SDU is seen by the PDCP layer entity 208(U23) as its SDU for further processing. The processing includes at least one of header compression, integrity protection, or ciphering. After processing, the outputted packet is a PDCP PDU, which is delivered from the PDCP layer entity 208(U23) of the third, aggregation RB 308(U2) radio bearer to the lower layer entity (e.g., the RLC layer entity 206(U23)).

In some embodiments, the second RB 306(U1) of the primary user device 102(1) may include the PDCP layer entity 208(U12) and the SDAP/RRC 210(U12), but not the RLC layer entity 206(U12). Correspondingly, the second RB 306(N1) of the first protocol stack configuration 302(1) may include the PDCP layer entity 208(N12) and the SDAP/RRC layer entity 210(N12), but not the RLC layer entity 206 (N12). For these embodiments, the PDCP layer entity 208 (U12) of the second RB 306(U1) delivers all PDCP PDUs to the PDCP layer entity 208(U12) of the third, aggregation RB 308(U1). Similarly, at the network side, the PDCP layer entity 208(N12) may delivers all PDCP PDUs to the PDCP layer entity 208(N22) of the second protocol stack configuration 302(2).

With respect to the embodiment of FIG. 8, the PDCP layer entity 208(U12) of the second RB 306(U1) may deliver the PDCP PDU to the RLC layer entity 206(U13) of the third aggregation RB 308(U1). The PDCP layer entity 208(U12) of the second RB 306(U1) may indicate to the RLC layer entity 206(U13) of the third, aggregation RB 308(U1) to discard the PDCP PDU delivered from the PDCP layer entity 208(U12) to the RLC layer entity 206(U13).

For the PDCP PDU delivered from the PDCP layer entity 208(U12) to the RLC layer entity 206, the RLC layer entity 206(U13) may indicate a successful delivery to the PDCP layer entity 208(U12). When the RLC layer entity 206(U13) receives a PDCP PDU from the PDCP layer entity 208 (U12), the RLC layer entity 206(U13) performs further processing according to the configuration of the third RB 308(U1). Additionally, the RLC layer entity 206(U13) of the third, aggregation RB 308(U1) may deliver all RLC PDUs or RLC SDU to the PDCP layer entity 208(U12) of second RB 306(U1).

In the secondary user device 102(2), the second RB 306(U2) is associated with the third, aggregation RB 308 (U2). Accordingly, the PDCP layer entity 208(U21) of the second RB 306(U2) is connected to the RLC layer entity 206(U23) of the third, aggregation RB 308(U2). In addition, the RLC layer entity 206(U23) of the third, aggregation RB 308(U2) delivers a RLC SDU to the PDCP layer entity 208(U21) of the second RB 306(U2). From the perspective of the PDCP layer entity 208(U21), the received RLC SDU is seen as its PDCP SDU for further processing. The processing includes at least one of header compression, integrity protection, or ciphering.

After processing, the outputted packet is a PDCP PDU, which is delivered to the RLC layer entity 206(U21). Additionally, the PDCP layer entity 208(U21) may process the packet received from the RLC layer entity 206(U21) according to the configuration of the second RB 306(U2). The processing includes at least one of header decompression, integrity verification, or deciphering. After processing, the outputted packet is delivered from the PDCP layer entity 208(U21) to the RLC layer entity 206(U23) of the third, aggregation RB 208(U2). When the RLC layer entity 206 (U23) of the third, aggregation RB 308(U2) receives a packet from the PDCP layer entity 208(U21) of the second RB 306(U2), it processes the packet according to the configuration of the third, aggregation RB 308(U2).

At the network side, when the PDCP layer entity 208 (N12) of the second RB 306(N2) of the first protocol stack configuration 302(1) receives a packet from an upper layer (e.g., the SDAP/RRC layer entity 210(N12)), it processes the received packet, and may then deliver it to the PDCP layer entity 208(N22) of the second RB 306(N2) of the second protocol stack configuration. From the perspective of the PDCP layer entity 208(N22), the received packet is seen as its PDU for further processing. After processing, the packet is delivered to a lower layer (e.g., the RLC layer entity 206(N22). When the PDCP layer entity 206(N22) receives a packet from a lower layer (e.g., the RLC layer entity 206(N22)), it processes the received packet and then delivers it to the PDCP layer entity 208(N12) of the first protocol stack configuration. From the perspective of the PDCP layer entity 208(N12), the received packet is seen as its PDCP PDU for further processing. After processing, the packet is delivered to an upper layer (e.g., the SDAP/RRC layer entity 210).

Other example methods are possible, including those that combine one or more of the blocks or actions of the method 900 and/or the method 1000.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The subject matter of the disclosure may also relate to or include, among others, the following aspects:

A first aspect includes a method for wireless communication that includes: establishing, with a first user device, an aggregation link between a first layer entity of the first user device and a second layer entity of a second user device; and communicating, with the first user device, a data packet with the second user device over the aggregation link.

A second aspect includes the first aspect, and further includes, wherein the first layer entity comprises a package data convergence protocol (PDCP) layer entity and the second layer entity comprises a radio-link control (RLC) layer entity.

A third aspect includes the second aspect, and further includes: wherein the data packet is for an uplink transmission between the first user device and a wireless access node, and wherein communicating the data packet with the second user device over the aggregation link comprises: sending the data packet from the PDCP layer entity of the first user device to the RLC layer entity of the second user device.

A fourth aspect includes the third aspect, and further includes: receiving, with the PDCP layer entity of the first user device, a feedback message from the RLC layer entity of the second user device, the feedback message indicating a successful delivery status of the data packet.

A fifth aspect includes the fourth aspect, and further includes wherein the feedback message comprises a bitmap indicating a plurality of successful delivery statuses, each for a respective one of a plurality of data packets delivered from the PDCP layer entity of the first user device to the RLC layer entity of the second user device.

A sixth aspect includes any of the third through fifth aspects, and further includes: indicating, with the PDCP layer entity of the first user device, to the RLC layer entity of the second user device to discard the data packet delivered from the PDCP layer entity of the first user device to the RLC layer entity of the second user device.

A seventh aspect includes any of the second through sixth aspects, and further includes wherein the data packet is for a downlink transmission between the first user device and a wireless access node, and wherein communicating the data packet with the second user device over the aggregation link comprises: receiving, with the PDCP layer entity of the first user device, the data packet from the RLC layer entity of the second user device.

An eighth aspect includes any of the second through seventh aspects, and further includes wherein the RLC layer entity of the second user device is connected to both the PDCP layer entity of the first user device via the aggregation link and a PDCP layer entity of the second user device, wherein the data packet comprises an index indicating whether the data packet is from, or to be delivered to, the PDCP layer entity of the first user device instead of the PDCP layer entity of the second user device.

A ninth aspect includes the first aspect, and further includes wherein first layer entity comprises a first package data convergence protocol (PDCP) layer entity and the second layer entity comprises a second PDCP layer entity.

A tenth aspect includes the ninth aspect, and further includes: allocating, with the first PDCP layer entity, a count value for the data packet, wherein communicating the data packet comprises: delivering, with the first PDCP layer entity of the first user device, the data packet with the count value to the second PDCP layer entity of the second user device.

An eleventh aspect includes the tenth aspect, and further includes: processing, with the second PDCP layer entity of the second user device, the data packet by performing at least one of: header compression, integrity protection, or ciphering based on the count value; and sending, with the second PDCP layer entity of the second user device, to a radio-link control (RLC) layer entity of the second user device after processing the data packet.

A twelfth aspect includes the ninth aspect, and further includes: receiving, with the second PDCP layer entity of the second user device, the data packet from a radio-link control (RLC) layer entity of the second user device; determining, with the second PDCP layer entity of the second user device, a count value for the data packet; and with the second PDCP layer entity, delivering the data packet to the first PDCP layer entity of the first user device or discarding the data packet based on the count value.

A thirteenth aspect includes the twelfth aspect, and further includes wherein the second PDCP layer entity has a state variable RX_DELIV, and wherein the determining the count value is based on a sequence number of the data packet and the state variable RX_DELIV.

A fourteenth aspect includes the thirteenth aspect, and further includes: determining, with the second PDCP layer entity, to discard the data packet in response to the count value being less than a value of the state value RX_DELIV; and delivering, with the second PDCP layer entity, the data packet and the count value to the first PDCP layer entity after performing at least one of header decompression, integrity verification, or deciphering based on the count value, in response to the count value being equal to or greater than the value of the state value RX_DELIV.

A fifteenth aspect includes the fourteenth aspect, and further includes: with the first PDCP layer entity, delivering the data packet to a layer entity of the first user device higher than the first PDCP layer entity or discarding the data packet based on the count value.

A sixteenth aspect includes the ninth aspect, and further includes: receiving, with the first PDCP layer entity, the data packet from a layer entity of the first user device higher than the first PDCP layer entity; processing, with the first PDCP layer entity, the data packet, wherein the processing comprises at least one of: header compression, integrity protection, or ciphering, wherein communicating the data packet comprises delivering, with the first PDCP layer entity, the data packet to the second PDCP layer entity after processing the data packet.

A seventeenth aspect includes the ninth aspect, and further includes: receiving, with the second PDCP layer entity, the data packet from the first PDCP layer entity; processing, with the second PDCP layer entity, the data packet, the processing comprising at least one of: header compression, integrity protection, or ciphering; and delivering, with the second PDCP layer entity, the data packet to a radio-link control (RLC) layer entity of the second user device after processing the data packet.

An eighteenth aspect includes the ninth aspect, and further includes: receiving, with the second PDCP layer entity, the data packet from a radio-link control (RLC) layer entity of the second user device; processing, with the second PDCP layer entity, the data packet, the processing comprising at least one of: header decompression, integrity verification, or deciphering, wherein communicating the data packet comprises delivering, with the second PDCP layer entity, the data packet to the first PDCP layer entity after processing the data packet.

A nineteenth aspect includes the ninth aspect, and further includes wherein communicating the data packet with the second user device over the aggregation link comprises: receiving, with the first PDCP layer entity, the data packet from the second PDCP layer entity, the further includes: processing, with the first PDCP layer entity, the data packet, the processing comprising at least one of: header decompression, integrity verification, or deciphering; delivering, with the first PDCP layer entity, the data packet to a layer entity of the first user device higher than the first PDCP layer entity after processing the data packet.

A twentieth aspect includes the ninth aspect, and further includes wherein the second PDCP layer entity is connected to both the first PDCP layer entity of the first user device via the aggregation link and an upper layer entity of the second user device higher than the second PDCP layer entity, wherein the data packet comprises an index indicating whether the data packet is from, or to be delivered to, the first PDCP layer entity instead of the higher layer entity.

A twenty-first aspect includes the first aspect, and further includes wherein: a first package data convergence protocol (PDCP) layer entity of the first user device is associated with a second PDCP layer entity of the first user device or with a radio-link control (RLC) layer entity of the first user device, or a radio bearer of the first PDCP layer entity of the first user device is associated with a radio bearer of the second PDCP layer entity of the first user device or with a radio bearer of the RLC layer entity of the first user device.

A twenty-second aspect includes the twenty-first aspect, and further includes: receiving, with the first PDCP layer entity, the data packet from the RLC layer entity of the first user device; processing, with the first PDCP layer entity of the first user device, the data packet, the processing comprising at least one of: header decompression, integrity verification, or deciphering; delivering, with the first PDCP layer entity of the first user device, the data packet to the second PDCP layer entity of the first user device after processing the data packet; processing, with the second PDCP layer entity of the first user device, the data packet after receiving the data packet from the first PDCP layer entity of the first user device, the processing comprising at least one of: header decompression, integrity verification, or deciphering; and delivering, with the second PDCP layer entity of the first user device, the data packet to a higher layer entity of the first user device after processing the data packet, the higher layer higher than the second PDCP layer entity of the first user device.

A twenty-third aspect includes the twenty-first aspect, and further includes: receiving, with the second PDCP layer entity of the first user device, the data packet from a higher layer entity of the first user device, the higher layer higher than the second PDCP layer entity of the first user device; processing, with the second PDCP layer entity of the first user device, the data packet, the processing comprising at least one of: header compression, integrity protection, or ciphering; delivering, with the second PDCP layer entity of the first user device, the data packet to the first PDCP layer entity of the first user device after processing the data packet; processing, with the first PDCP layer entity of the first user device, the data packet after receiving the data packet from the second PDCP layer entity of the first user device, the processing comprising at least one of: header compression, integrity protection, or ciphering; and delivering, with the first PDCP layer entity of the first user device, the data packet to the RLC layer entity of the first user device.

A twenty-fourth aspect includes the first aspect, and further includes wherein: a first package data convergence protocol (PDCP) layer entity of the second user device is associated with a second PDCP layer entity of the second user device or with a RLC layer entity of the second user device, or a radio bearer of the first PDCP layer entity of the second user device is associated with a radio bearer of the second PDCP layer entity of the second user device or with a radio bearer of the RLC layer entity of the second user device.

A twenty-fifth aspect includes the twenty-fourth aspect and further wherein the RLC layer entity comprises a second RLC layer entity, and further includes: receiving, with the first PDCP layer entity of the second user device, the data packet from a first radio-link control (RLC) layer entity of the second user device; processing, with the first PDCP layer entity of the second user device, the processing comprising at least one of: header decompression, integrity verification, or deciphering; delivering, with the first PDCP layer entity of the second user device, the data packet to a second PDCP layer entity of the second user device after processing the data packet; processing, with the second PDCP layer entity of the second user device, the data packet after receiving the data packet from the first PDCP layer entity of the first user device, the processing comprising at least one of header compression, integrity protection, or ciphering; and delivering, with the second PDCP layer entity of the second user device, the data packet to the second RLC layer of the second user device after processing the data packet.

A twenty-sixth aspect includes the first aspect, and further includes: communicating the data packet between a package data convergence protocol (PDCP) layer entity of a first radio bearer of the first user device and a radio-link control (RLC) layer entity of a second radio bearer of the first user device.

A twenty-seventh aspect includes the twenty-sixth aspect, and further includes: indicating, with the PDCP layer entity, to the RLC layer entity to discard the data packet.

A twenty-eighth aspect includes any of the twenty-sixth or twenty-seventh aspects, and further includes: indicating, with the RLC layer, a successful delivery of the data packet to the PDCP layer entity.

A twenty-ninth aspect includes the first aspect, and further includes: communicating the data packet between a first radio-link control (RLC) layer entity of a first radio bearer of the second user device and a package data convergence protocol (PDCP) layer entity of a second radio bearer of the second user device; and communicating the data packet between the PDCP layer entity of the second radio bearer of the second user device and a second RLC layer entity of the second radio bearer of the second user device.

A thirtieth aspect includes the twenty-ninth aspect, and further includes: processing, with the PDCP layer entity of the second radio bearer of the second user device, the data packet, the processing comprising at least one of: header compression, integrity protection, or ciphering, wherein communicating the data packet between the first RLC layer entity and the PDCP layer entity comprises: receiving, with the PDCP layer entity of the second radio bearer of the second user device, the data packet from the first RLC layer entity of the first radio bearer of the second user device, and wherein communicating the data packet between the PDCP layer entity and the second RLC layer entity comprises: delivering, with the PDCP layer entity of the second radio bearer of the second user device, the data packet to the second RLC layer entity of the second radio bearer of the second user device after processing the data packet.

A thirty-first aspect includes the twenty-ninth aspect, and further includes: processing, with the PDCP layer entity of the second radio bearer of the second user device, the data packet, the processing comprising at least one of: header decompression, integrity verification, or deciphering, wherein communicating the data packet between the PDCP layer entity and the second RLC layer entity comprises: receiving, with the PDCP layer entity of the second radio bearer of the second user device, the data packet from the second RLC layer entity of the second radio bearer of the second user device, and wherein communicating the data packet between the first RLC layer entity and the PDCP layer entity comprises: delivering, with the PDCP layer entity of the second radio bearer of the second user device, the data packet to the first RLC layer entity of the first radio bearer of the second user device after processing the data packet.

A thirty-second aspect includes any of the first through thirty-first aspects, and further includes wherein the data packet corresponds to an uplink transmission or a downlink transmission between the first user device and a wireless access node.

A thirty-third aspect includes any of the first, second, or ninth through thirty-first aspects, and further includes wherein the data packet corresponds to a sidelink transmission between the first user device and a third user device.

A thirty-fourth aspect includes any of the first through thirty-third aspects, and further wherein the first layer entity is part of a first aggregation radio bearer of the first user device and the second layer entity is part of a second aggregation radio bearer of the second user device.

A thirty-fifth aspect includes any of the first through thirty-fourth aspects, and further includes wherein communicating the data packet with the second user device over the aggregation link comprises communicating the data packet on a data tunnel of the aggregation link.

A thirty-sixth aspect includes the thirty-fifth aspect, and further includes wherein the data packet indicates a data tunnel index of the data tunnel.

A thirty-seventh aspect includes the thirty-sixth aspect and further includes wherein the data tunnel comprises one of a plurality of data tunnels of the aggregation link.

A thirty-eighth aspect includes the thirty-seventh aspect and further includes wherein one of the plurality of data tunnels is associated with the first layer entity of the first user device or with the second layer entity of the second user device.

A thirty-ninth aspect includes any of the thirty-fifth through thirty-eighth aspect, and further includes wherein the data packet indicates a source radio bearer index of a source radio bearer or a destination radio bearer index of a destination radio bearer.

The fortieth aspect includes any of the thirty-fifth, thirty-sixth, or thirty-eighth aspects, and further wherein the data tunnel comprises only one data tunnel.

A forty-first aspect includes a method for wireless communication that includes: communicating a data packet between a first layer entity of a first protocol stack configuration of a wireless access node and a second layer entity of a second protocol stack configuration of the wireless access node, the first protocol stack configuration for a first user device and the second protocol stack configuration for a second user device, the data packet for a transmission between the wireless access node and the first user device; and communicating, with the second protocol stack configuration, the data packet with the second user device.

A forty-second aspect includes the forty-first aspect, and further includes wherein the first layer entity comprises a package data convergence protocol (PDCP) layer entity and the second layer entity comprises a radio-link control (RLC) layer entity.

A forty-third aspect includes the forty-first aspect, and further includes wherein the first layer entity comprises a first package data convergence protocol (PDCP) layer entity and the second layer entity comprises a second PDCP layer entity.

A forty-fourth aspect includes any of the forty-first through forty-third aspects, and further includes wherein the transmission comprises an uplink transmission between the wireless access node and the first user device, and wherein communicating, with the second protocol stack configuration, the data packet with the second user device comprises receiving, with the second protocol stack configuration, the data packet from the second user device.

A forty-fifth aspect includes any of the forty-first through forth-third aspects, and further includes wherein the transmission comprises a downlink transmission between the wireless access node and the first user device, and wherein communicating, with the second protocol stack configuration, the data packet with the second user device comprises transmitting, with the second protocol stack configuration, the data packet to the second user device.

A forty-sixth aspect includes a wireless communications apparatus comprising a processor and a memory, wherein the processor is configured to read code from the memory to implement any of the first through forty-fifth aspects.

A forty-seventh aspect includes a computer program product comprising a computer-readable program medium comprising code stored thereupon, the code, when executed by a processor, causing the processor to implement any of the first through forty-fifth aspects.

In addition to the features mentioned in each of the independent aspects enumerated above, some examples may show, alone or in combination, the optional features mentioned in the dependent aspects and/or as disclosed in the description above and shown in the figures.

The invention claimed is:

1. A method for wireless communication, the method comprising:

establishing, with a first user device, an aggregation link between a physical layer entity of the first user device and a physical layer entity of a second user device, wherein the aggregation link is for an uplink (UL) path and/or a downlink (DL) path, and wherein at least one data packet is communicated on the UL path and/or the DL path between a package data convergence protocol (PDCP) layer entity of the first user device and a radio-link control (RLC) layer entity of the second user device, and wherein the at least one data packet is transmitted by the RLC layer entity to a medium access control (MAC) layer entity of the second user device on the UL path and/or received by the RLC layer entity from the MAC layer entity on the DL path;

communicating, with the first user device, the at least one data packet with the second user device over the aggregation link; and indicating, with the PDCP layer entity of the first user device, to the RLC layer entity of the second user device, to discard a data packet of the at least one data packet delivered from the PDCP layer entity of the first user device to the RLC layer entity of the second user device.

2. The method of claim 1, wherein a data packet of the at least one data packet is for an uplink transmission between the first user device and a wireless access node, and wherein communicating the at least one data packet with the second user device over the aggregation link comprises: sending the data packet from the PDCP layer entity of the first user device to the RLC layer entity of the second user device.

3. The method of claim 2, further comprising: indicating, with the PDCP layer entity of the first user device, to a RLC layer entity of the first user device to discard a data packet delivered from the PDCP layer entity of the first user device to the RLC layer entity of the first user device.

4. The method of claim 1, wherein a data packet of the at least one data packet is for a downlink transmission between the first user device and a wireless access node, and wherein communicating the data packet with the second user device over the aggregation link comprises: receiving, with the PDCP layer entity of the first user device, the data packet from the RLC layer entity of the second user device.

5. The method of claim 1, wherein a header of the data packet includes a source radio bearer index of a source radio bearer.

6. A method for wireless communication, the method comprising:

establishing, with a second user device, an aggregation link between a physical layer entity of the second user device and a physical layer entity of a first user device, wherein the aggregation link is for an uplink (UL) path and/or a downlink (DL) path, and wherein at least one data packet is communicated on the UL path and/or the DL path between a package data convergence protocol (PDCP) layer entity of the first user device and a radio-link control (RLC) layer entity of the second user device, and wherein the at least one data packet is transmitted by the RLC layer entity to a medium access control (MAC) layer entity of the second user device on the UL path and/or received by the RLC layer entity from the MAC layer entity on the DL path;

communicating, with the second user device, at least one data packet with the first user device over the aggregation link;

receiving, with the RLC layer entity of the second user device, an indication from the PDCP layer of the first user device, the indication indicating to discard a data packet of the at least one data packet delivered from the PDCP layer entity of the first user device to the RLC layer entity of the second user device.

7. The method of claim 6, wherein a data packet of the at least one data packet is for an uplink transmission between the first user device and a wireless access node, and wherein communicating the data packet with the first user device over the aggregation link comprises: receiving, with the RLC layer entity of the second user device, the data packet from the PDCP layer entity of the first user device.

8. The method of claim 7, further comprising: receiving, with a RLC layer of the first user device, an indication from the PDCP layer entity of the first user device, the indication indicating to discard a data packet delivered from the PDCP layer entity of the first user device to the RLC layer entity of the first user device.

9. The method of claim 6, wherein a data packet of the at least one data packet is for a downlink transmission between the first user device and a wireless access node, and wherein communicating the data packet with the first user device over the aggregation link comprises: transmitting, with the RLC layer entity of the second user device, the data packet to the PDCP layer entity of the first user device.

10. The method of claim 6, wherein a header of the data packet includes a source radio bearer index of a source radio bearer.

11. A first user device comprising:

a memory storing a plurality of instructions; and at least one processor configured to execute the plurality of instructions, wherein upon execution of the plurality of instructions, the at least one processor is configured to cause the first user device to:

establish an aggregation link between a physical layer entity of the first user device and a physical layer entity of a second user device, wherein the aggregation link is for an uplink (UL) path and/or a downlink (DL) path, and wherein at least one data packet is communicated on the UL path and/or the DL path between a package data convergence protocol (PDCP) layer entity of the first user device and a radio-link control (RLC) layer entity of the second user device, and wherein the at least one data packet is transmitted by the RLC layer entity to a medium access control (MAC) layer entity of the second user device on the UL path and/or received by the RLC layer entity from the MAC layer entity on the DL path;

communicate at least one data packet with the second user device over the aggregation link; and indicate, with the PDCP layer entity of the first user device, to the RLC layer entity of the second user device, to discard a data packet of the at least one data packet delivered from the PDCP layer entity of the first user device to the RLC layer entity of the second user device.

* * * * *